United States Patent
Palgon et al.

(10) Patent No.: US 8,458,487 B1
(45) Date of Patent: Jun. 4, 2013

(54) SYSTEM AND METHODS FOR FORMAT PRESERVING TOKENIZATION OF SENSITIVE INFORMATION

(75) Inventors: Gary Palgon, Atlanta, GA (US); Jason Chambers, Dunwoody, GA (US); Dan Konisky, Atlanta, GA (US)

(73) Assignee: Liaison Technologies, Inc., Alpharetta, GA (US)

( * ) Notice: Subject to any disclaimer, the term of this patent is extended or adjusted under 35 U.S.C. 154(b) by 210 days.

(21) Appl. No.: 13/040,133

(22) Filed: Mar. 3, 2011

Related U.S. Application Data

(60) Provisional application No. 61/310,182, filed on Mar. 3, 2010.

(51) Int. Cl.
*H04L 29/06* (2006.01)

(52) U.S. Cl.
USPC ........... 713/185; 713/174; 713/189; 713/193; 726/9; 380/28; 380/277

(58) Field of Classification Search
USPC ........................................................ 713/185
See application file for complete search history.

(56) References Cited

U.S. PATENT DOCUMENTS

| | | | | |
|---|---|---|---|---|
| 8,208,627 B2* | 6/2012 | Pauker et al. | | 380/28 |
| 2009/0169016 A1* | 7/2009 | Dodd | | 380/278 |
| 2009/0249082 A1* | 10/2009 | Mattsson | | 713/193 |
| 2011/0154466 A1* | 6/2011 | Harper et al. | | 726/9 |

OTHER PUBLICATIONS

Stapleton, Jeff and Ralph Spencer Poore. "Tokenization and Other Methods of Security for Cardholder Data." Information Security Journal: A Global Perspective, 20: 2 [Apr. 11, 2011]: 91-99.*

* cited by examiner

*Primary Examiner* — Taghi Arani
*Assistant Examiner* — Narciso Victoria
(74) *Attorney, Agent, or Firm* — FisherBroyles LLP

(57) ABSTRACT

Systems and methods for secure access and utilization of sensitive data such as credit card numbers, Social Security Numbers, personal identifying information, etc. A tokenizing strategy component provides for creating, managing, and storing tokenization strategies on behalf of a plurality of users. A data tokenizing component is operative to (a) receive an input data string of sensitive data from a user, (b) apply a selected tokenization strategy to the input data string to generate a tokenized data string, and (c) provide the tokenized data string for storage in association with the input data string. A secure server including a secure database stores the tokenized data string and the input data string in a corresponding mapped relationship. A security component controls access to and retrieval of the tokenized data string and to the input data string in accordance with predetermined security requirements of the users.

25 Claims, 24 Drawing Sheets

Method for Secure Access and Utilization of Sensitive Data

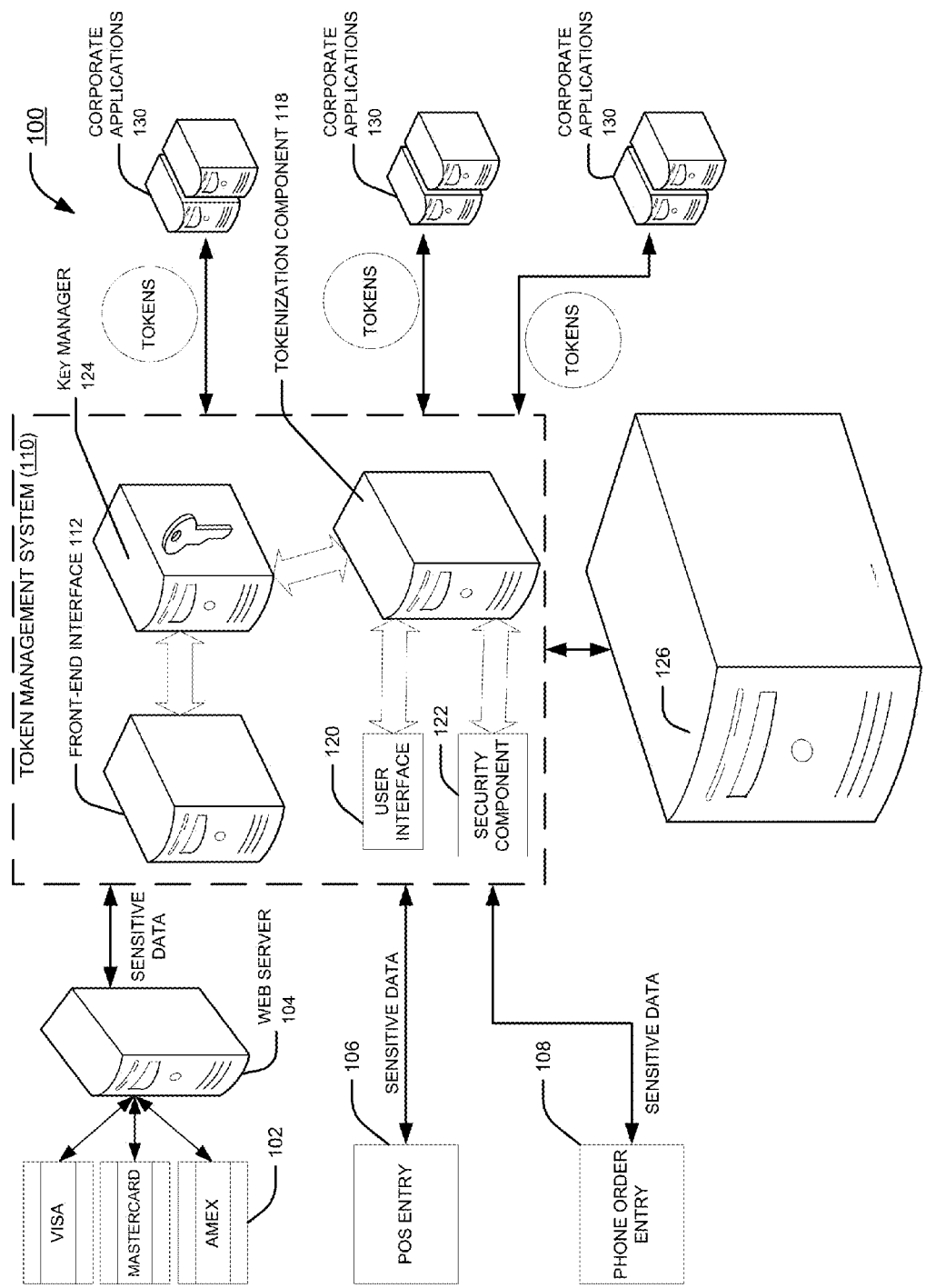
FIG. 1 - Exemplary System for Secure Access and Utilization of Sensitive Data

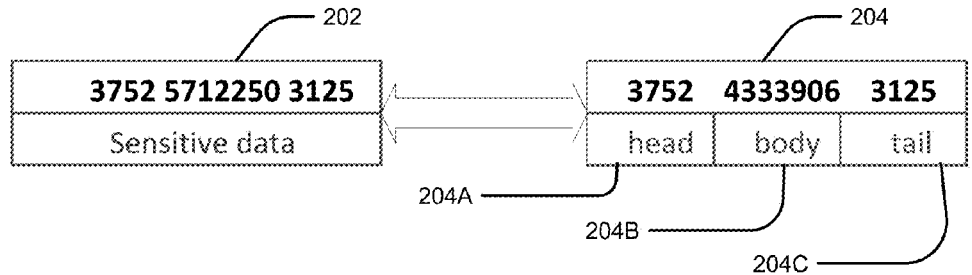
FIG. 2A - Exemplary Tokenization of Input String
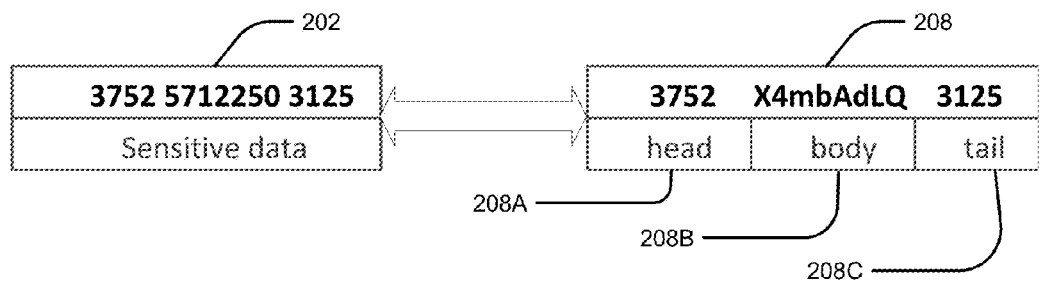
FIG. 2B - Exemplary Tokenization of Input String
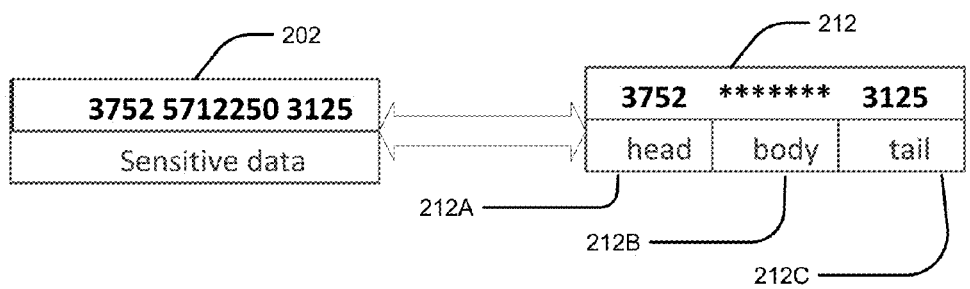
FIG. 2C - Exemplary Tokenization of Input String

FIG. 3A - *Exemplary Conventional Interface of Store's Business Analytics Application*
FIG. 3B - *Exemplary Interface of Store's Business Analytics Application Using Tokenization*

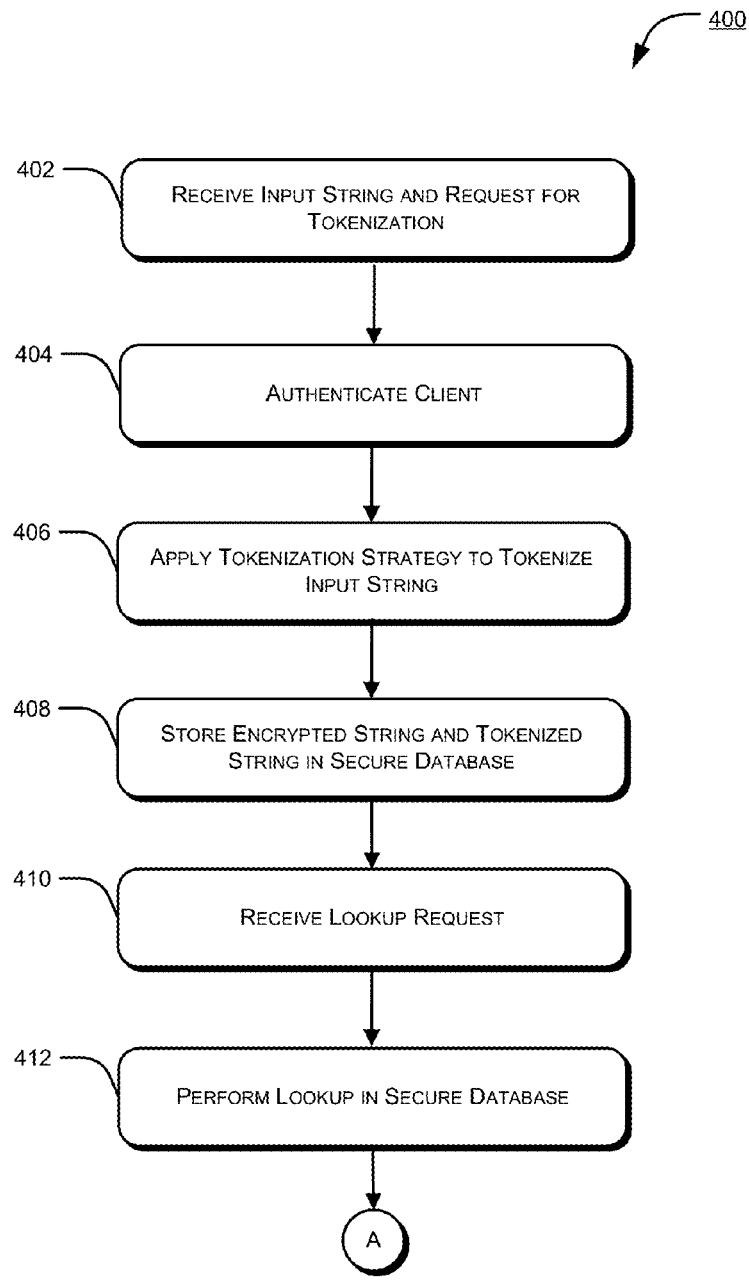
*FIG. 4A – Method for Secure Access and Utilization of Sensitive Data*

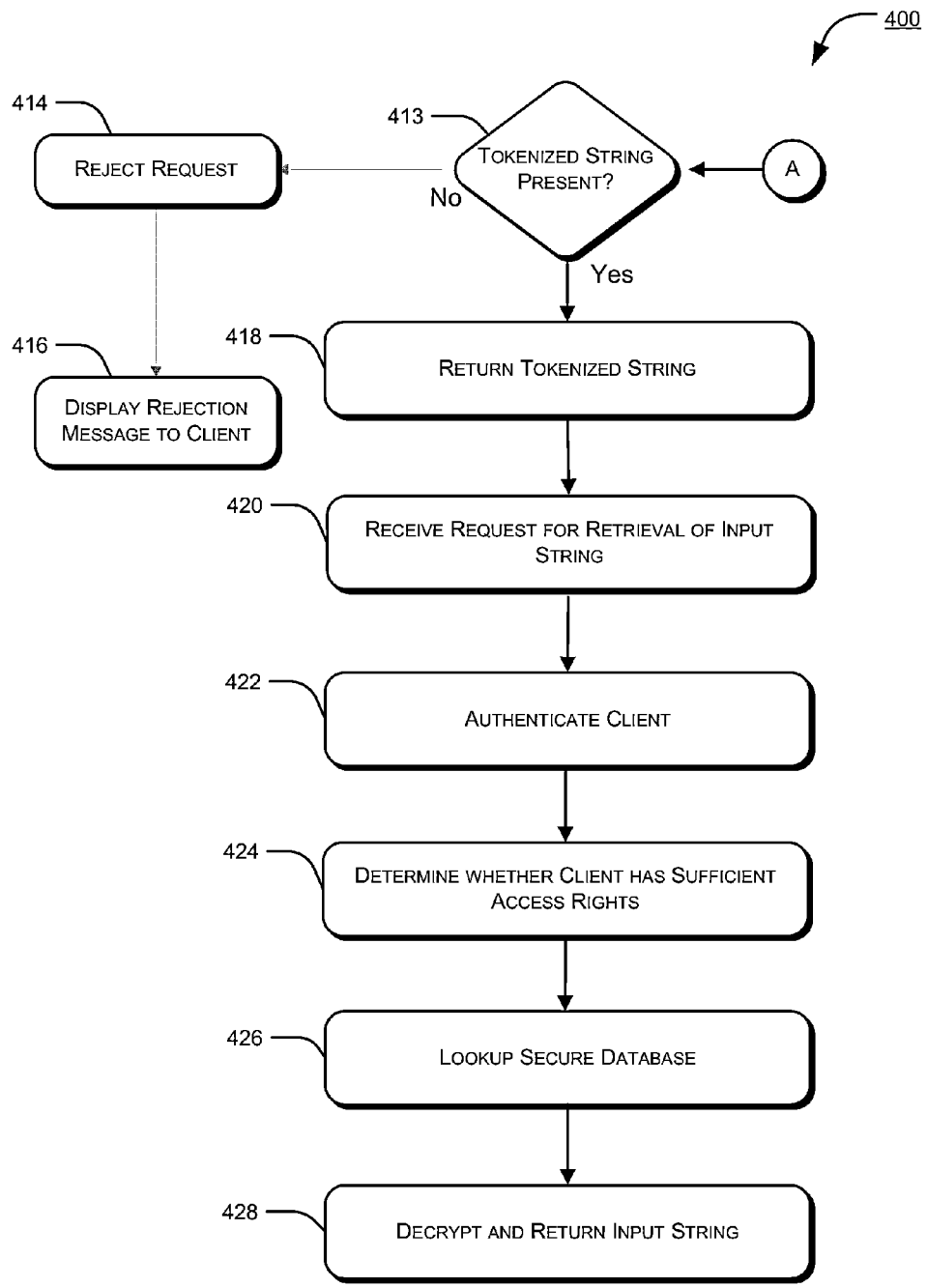
FIG. 4B – Method for Secure Access and Utilization of Sensitive Data

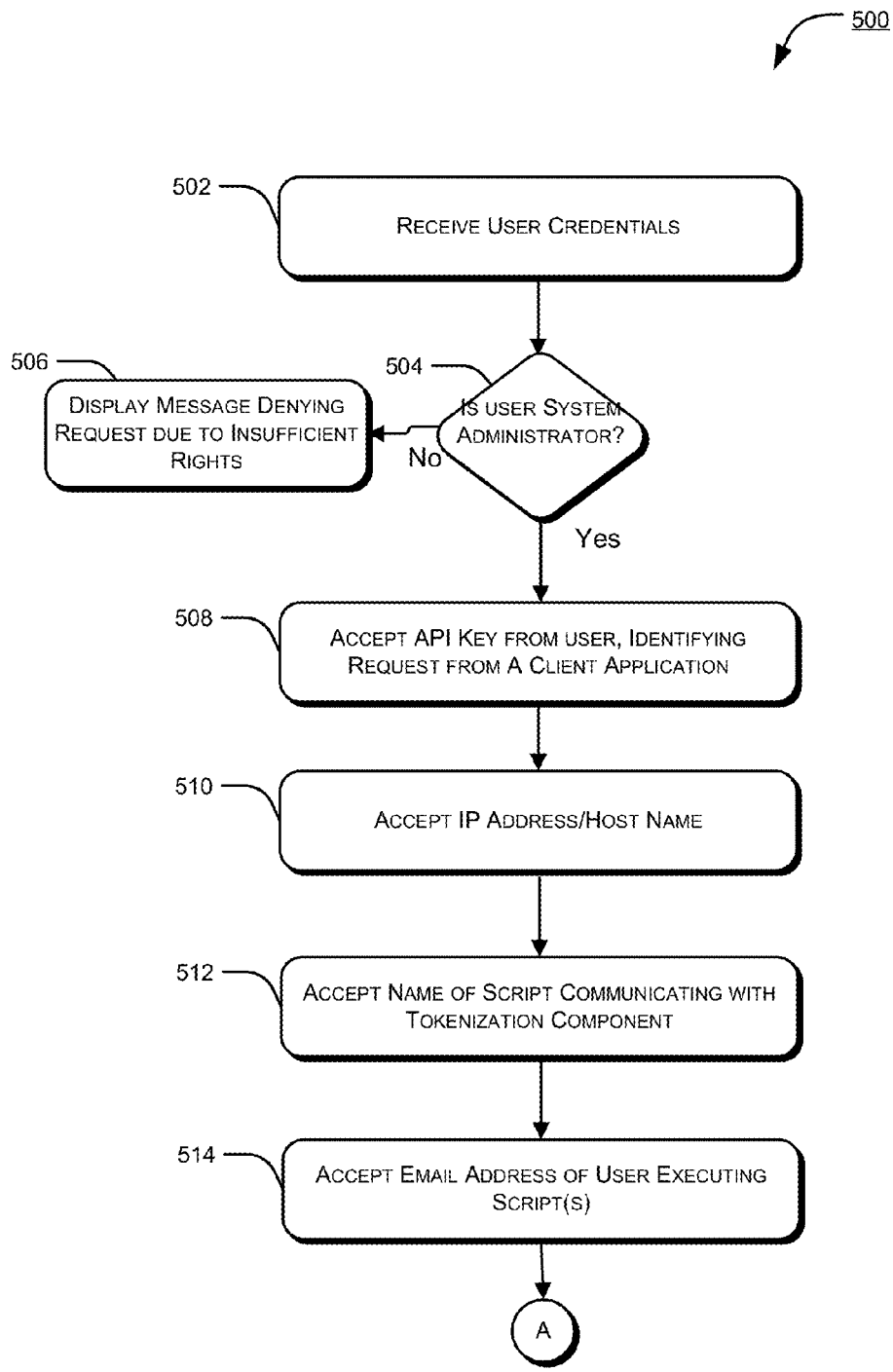
FIG. 5A – Method for Validating Authorization and Performing Tokenization

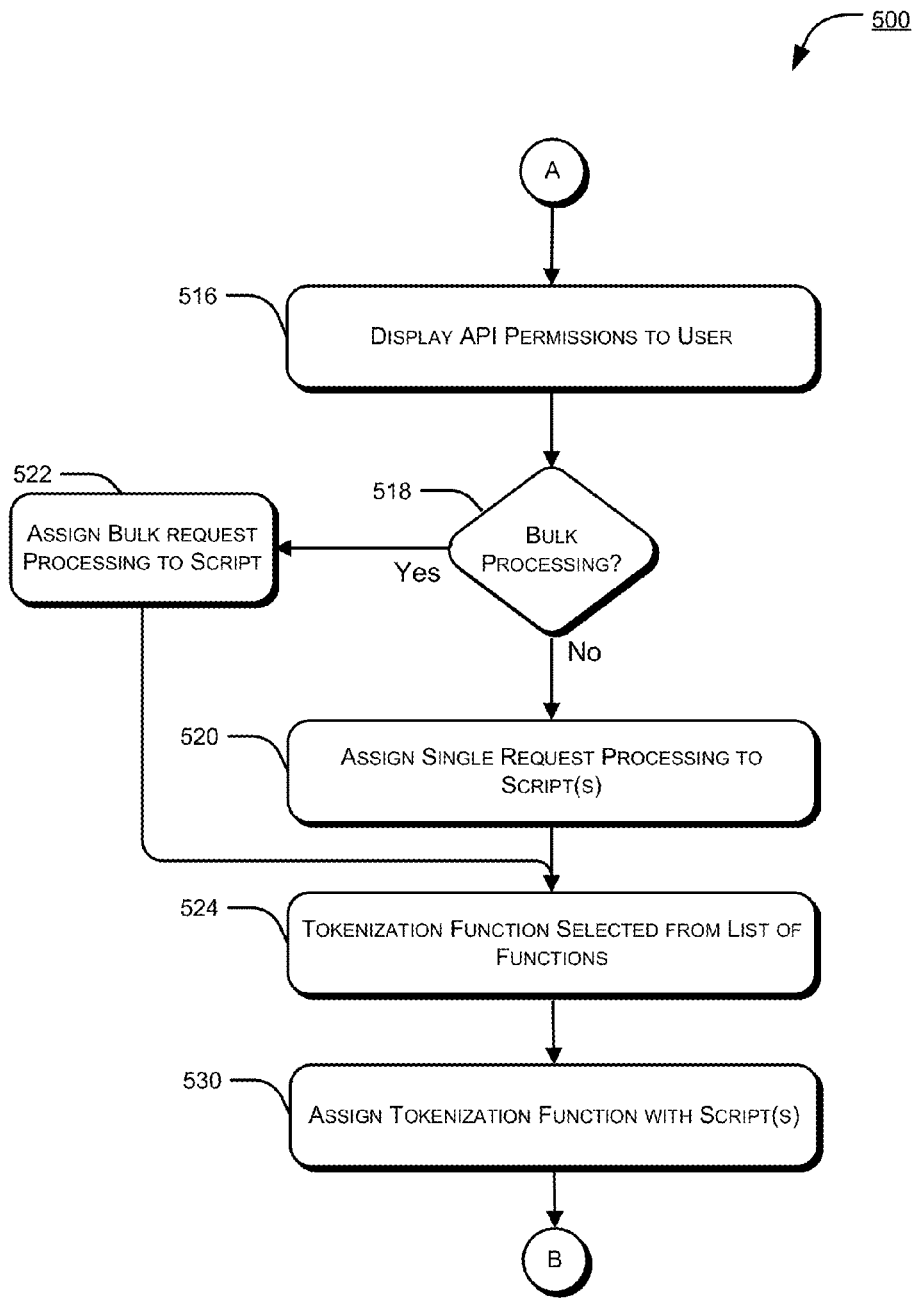
FIG. 5B – Method for Validating Authorization and Performing Tokenization

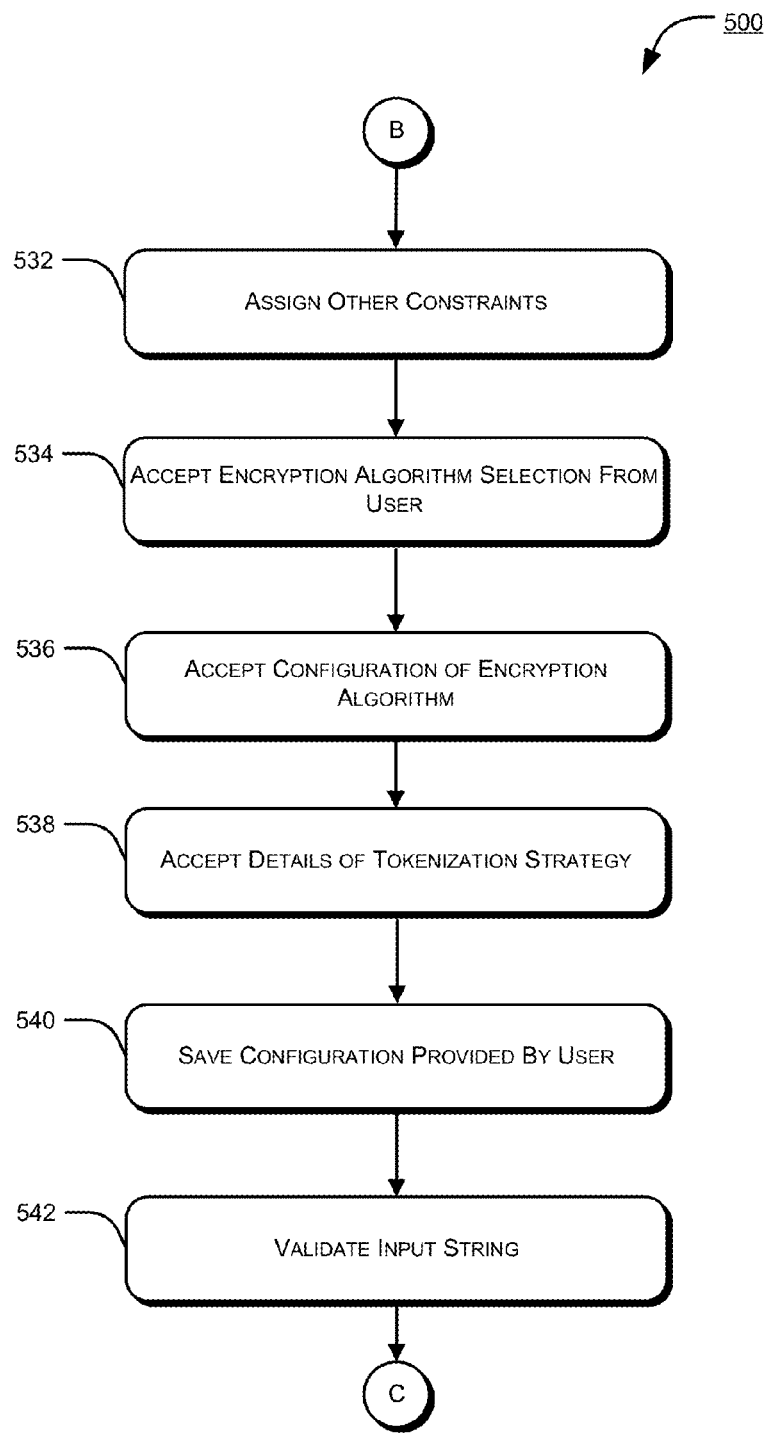
FIG. 5C – Method for Validating Authorization and Performing Tokenization

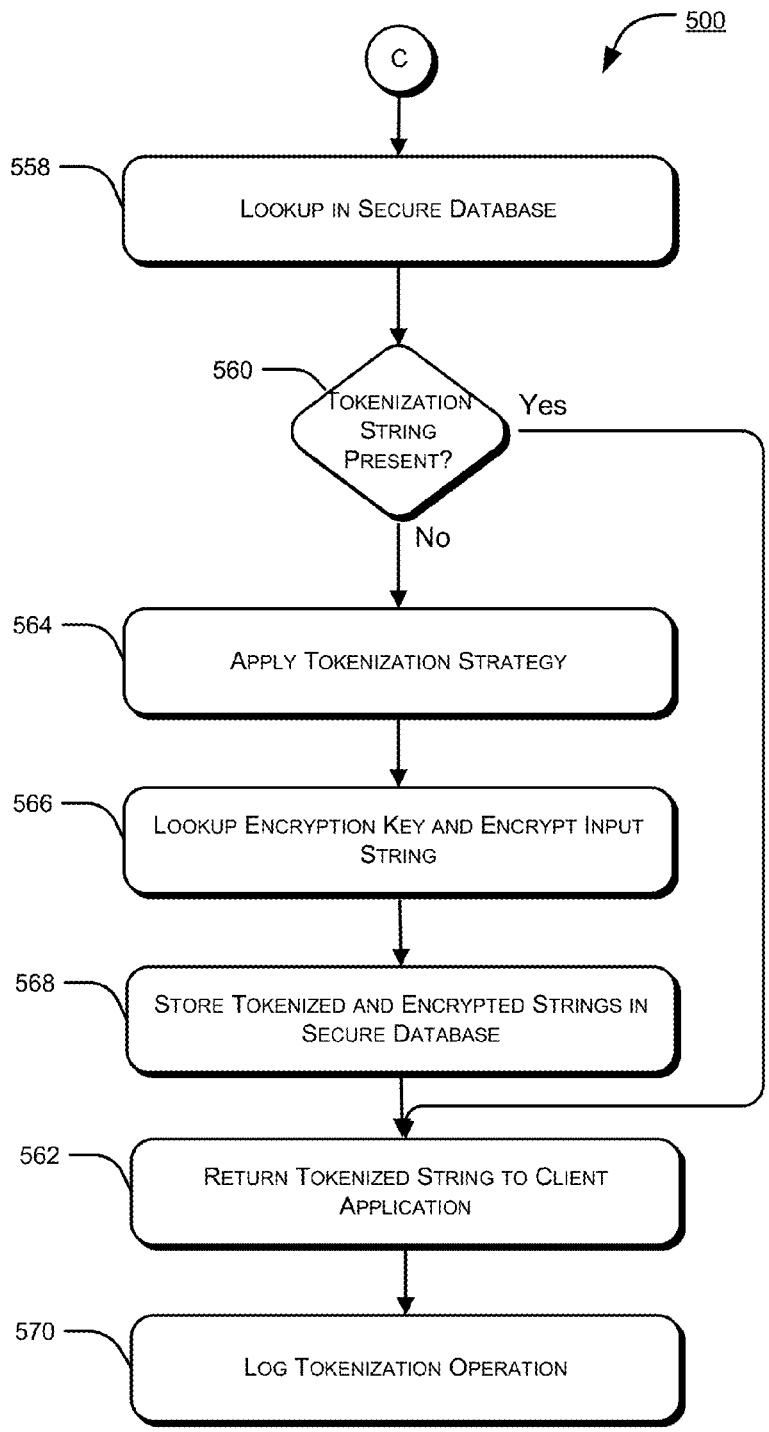
FIG. 5D – Method for Validating Authorization and Performing Tokenization

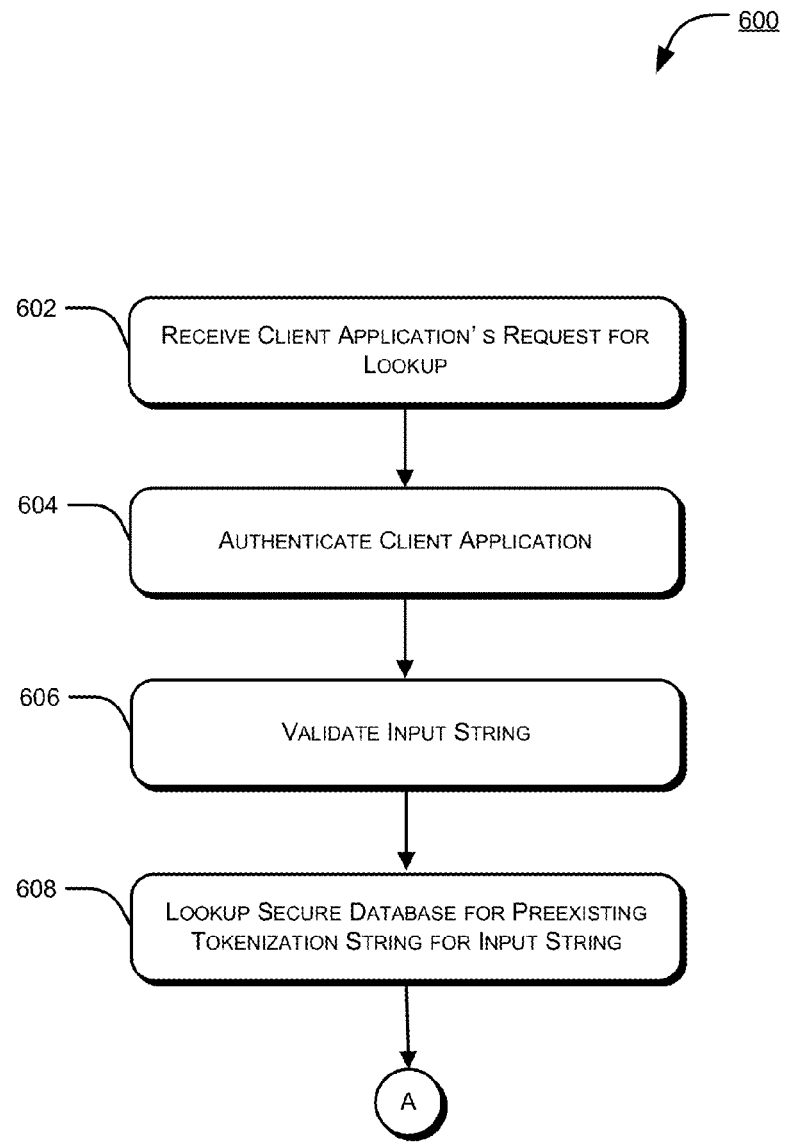
FIG. 6A – Method for Performing Lookup Function

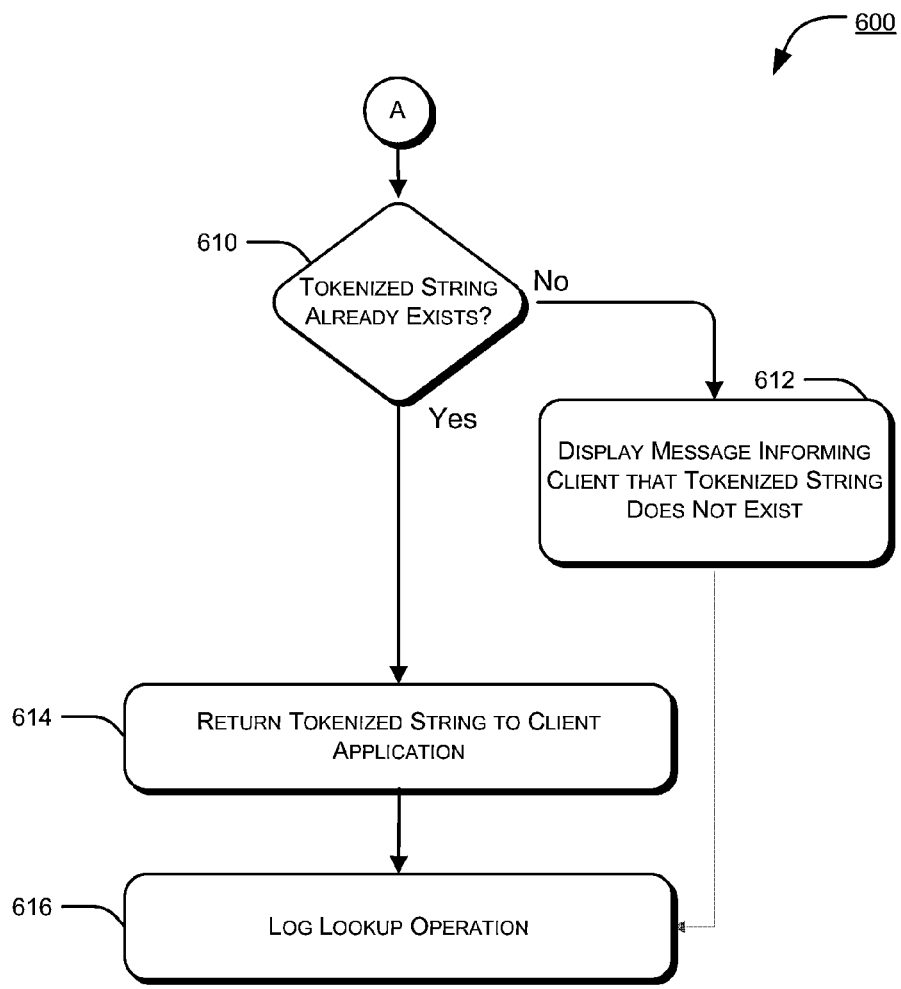
FIG. 6B – Method for Performing Lookup Function

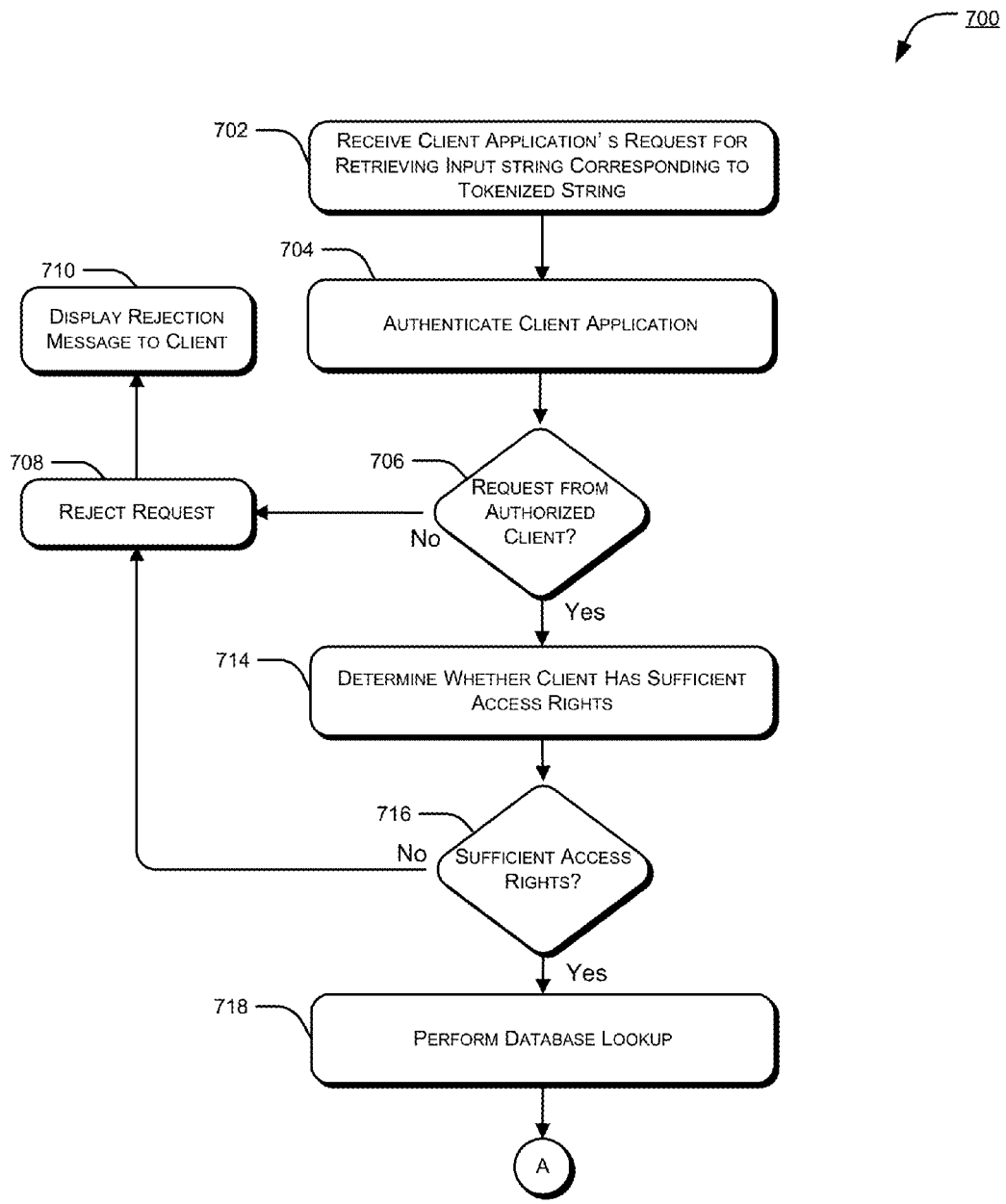
FIG. 7A – Method for Input String Retrieval from Secure Database

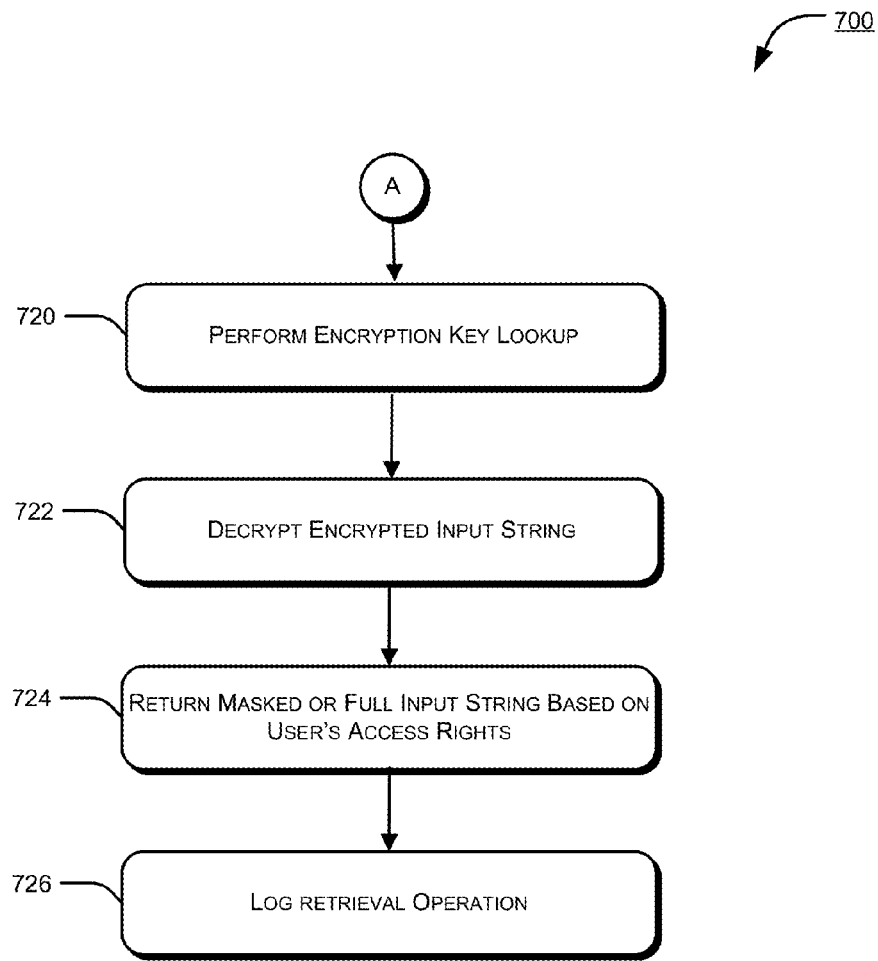
FIG. 7B – Method for Input String Retrieval from Secure Database

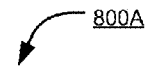
| Name | Credit Card Number |
|---|---|
| Bill | 1234-8738-0934-0923 |
| Fred | 3674-0834-9487-9202 |
| Bob | 1254-5921-8473-0288 |
| Sandy | 7465-9827-7173-9870 |
| Jesse | 7462-9494-8373-1513 |
*FIG. 8A – Exemplary Client Application Database Schema before Tokenization*
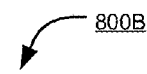
| Name | Credit Card Number |
|---|---|
| Bill | 1234-3547-1545-0923 |
| Fred | 3674-5747-2742-9202 |
| Bob | 1254-3636-2367-0288 |
| Sandy | 7465-2767-2371-9870 |
| Jesse | 7462-3659-5469-1513 |
*FIG. 8B – Exemplary Client Application Database Schema after Tokenization*

Exemplary Database Schema of Table in Secure Database 900

| Tokenized String | Hash | Encrypted Input String | Key Profile |
|---|---|---|---|
| 1234-3547-1545-0923 | 1cde143ab0 | 16208dhffdj4jdjws | 1 |
| 3674-5747-2742-9202 | 5gdr146ab5 | 56205dhfbdj7jddhs | 3 |
| 1254-3636-2367-0288 | 7ede340ab2 | 76208dhfgcj2jdjnr | 5 |
| 7465-2767-2371-9870 | 6ydh160ab7 | 26207dhfddj7jrths | 7 |
| 7462-3659-5469-1513 | 8ude145ab4 | 16208dhegdj8jdjrt | 0 |

FIG. 9

Exemplary Screen for Encryption Management　1000A

Protection Strategy->Encryption Management

[Define Participant Alias]

Resources

| Name ▲ | Log Encrypt | Log Full Decrypt | Log Decrypt with Expired Key | Status |
|---|---|---|---|---|
| resource | N | N | N | ENABLED |

Keys

| Key Id | Comments | In use? | Activation Date | Expiration Date | Algorithm | Algorithm Mode | S |
|---|---|---|---|---|---|---|---|
| 1* | | Yes | T04:00:00 | T04:00:00 | AES | CBC | E |

[Disable Key] [Delete Key] [Save Comments]

* This key is marked as the latest key.

[Disable Resource] [Delete Resource]

FIG. 10A

Exemplary Screen for Configuring Tokenization Strategy — 1000B

Protection Strategy->Token Management

[Add] [Delete]

| Name | Description |
|---|---|
| testStrategy | some strategy |
| CC_NUM | |

[Input Data] [Tokenization] [Encryption] [Storage] [Masking] [Activity]

Return data in the clear for all authorized requests: ☐

Default mask
Show leading: 0  —1002
Show trailing: 4  —1004

Mask: [1234567890123456] [Test] [************3456]
         —1006              —1008        —1010

[Save] [Undo] [Validate] [Activate]

FIG. 10B

Exemplary Screen for Configuring Tokenization Strategy 1000C

Protection Strategy->Token Management

[Add] [Delete]

| Name | Description |
|---|---|
| testStrategy | some strategy |
| CC_NUM | |

[Input Data] [Tokenization] [Encryption] [Storage] [Masking] [Activity]

Format Preserving Tokenization: ☑ —1012
In Event of Overflow: [Reject request ▼]
Use Padding: ☐
Preserve head of data in token: [6] —1014
Preserve tail of data in token: [4] —1016
Tokenize: [1234567890123456] [Test] [1234560000053456]
　　　　　　—1018　　　　—1020　　　—1022

[Save] [Undo] [Validate] [Activate]

FIG. 10C

Exemplary Screen for Client Definition 1000E

Clients->Clients

[Add]

| Name | Hostname / IP address | Owner contact E-mail | Description |
|------|----------------------|----------------------|-------------|
| groovy | 10.0.24.182 | trobison@nuBridges.com | Client to execute groovy scripts |

Name: groovy

Hostname / IP address: 10.0.24.182

Owner contact E-mail: trobison@nuBridges.com

Client Role: someRole ▼

Description:
Client to execute groovy scripts.

[Save] [Undo] [Delete] [Disable]

FIG. 10E

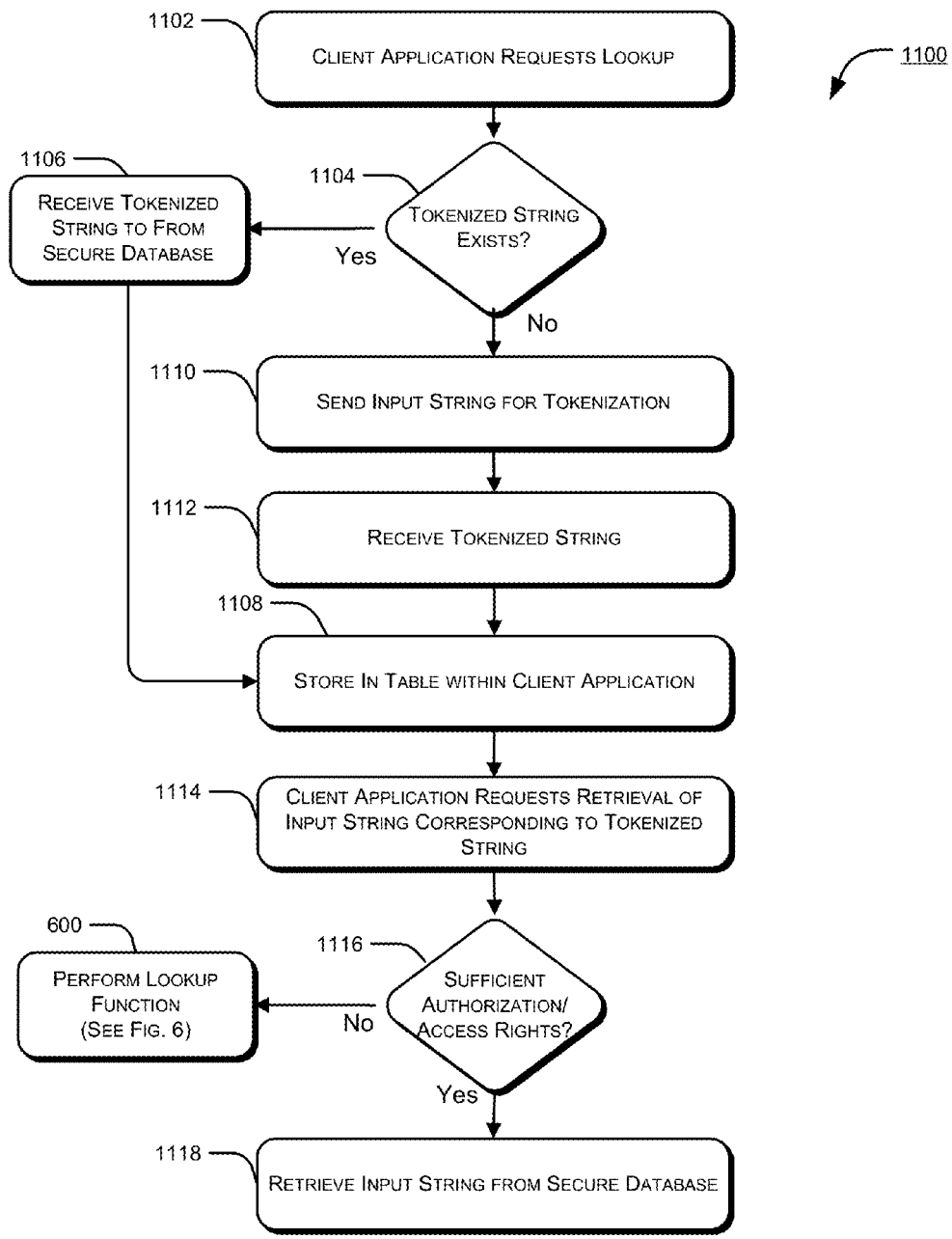
FIG. 11 – Method for Secure Access and Utilization of Sensitive Data in a Business Process

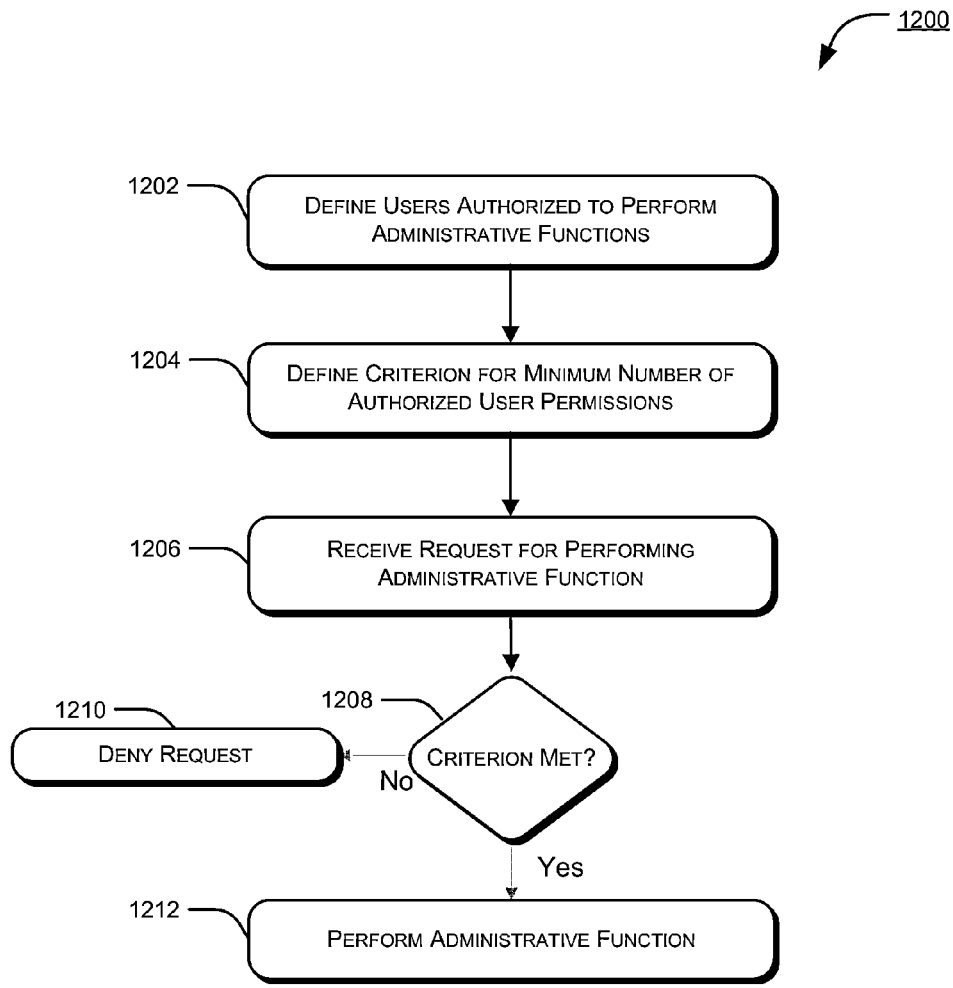
FIG. 12 – Method for Performing Quorum-Based Authorization

SYSTEM AND METHODS FOR FORMAT PRESERVING TOKENIZATION OF SENSITIVE INFORMATION

CROSS REFERENCE TO RELATED APPLICATION

This application claims the benefit of and priority under 35 U.S.C. §119(e) to U.S. Provisional Patent Application No. 61/310,182 filed Mar. 3, 2010 and entitled "System and Methods for Format Preserving Tokenization of Sensitive Information". The above-referenced application is hereby incorporated by reference as if set forth herein in its entirety.

TECHNICAL FIELD

The present application relates generally to data security, and more particularly to methods and systems for secure and efficient management and utilization of sensitive data within data and transaction processing systems.

BACKGROUND

Enterprises today face evolving global data privacy risks and challenges. Explosive proliferation of business-critical and sensitive electronic data stored in multiple applications and databases, together with mobile workforces scattered around the globe, exacerbate the situation.

A fundamental technique used to secure data and render it useless when improperly accessed, as by individuals or systems without proper credentials, encryption keys are used to encrypt data. The encrypted data, called cipher text, is generally larger than the original value. In a database environment, a larger data size requires expanding the size of the field to accommodate the storage of the cipher text, which would in turn require changing the database schema to accommodate different size data. That process that only presents a large workload, but it also poses considerable risk Storing data in encrypted form for credit card numbers, health data, or other sensitive information is much safer than storing clear text values, though some risk remains, as encryption keys must be distributed to all systems that need to decrypt the information. It is possible for even such a distributed system to be compromised by a sophisticated hacking attack.

Therefore, a long-felt but unresolved need exists for a system or method that provides secure access to sensitive data, while maintaining the data format for easy utilization by existing systems.

BRIEF SUMMARY

Briefly described, the present disclosure describes various methods and systems for providing secure access to and utilization of sensitive data such as personal identifying information, credit card numbers, financial account numbers, healthcare related information, biometric data, and the like. Primarily, the disclosure relates to a platform and processes for receiving sensitive information from a business process, typically via an electronic communication from an enterprise computing system or transaction processing system. In particular, the described systems and methods provide for replacement of the sensitive data with a token, i.e. a tokenized data string, that is used in substitute of the sensitive data in data processing functions of the enterprise. Also, the system provides for various and flexible methods for implementing different tokenization strategies so as to meet various different data storage, processing, and utilization needs.

Still more particularly, aspects of the present invention relate to "format preserving" tokenization of the sensitive data. In this respect, the present disclosure describes a system with a corresponding method for format preserving tokenization of sensitive data for use in a computer-implemented data processing operation so as to protect the sensitive data from unauthorized access by persons not having authorization to the sensitive data. In many such systems, the sensitive data provided in an input data string having a predetermined number of characters, with the input data string corresponding to sensitive data derived in connection with the client process for tokenization. The input data strings may be numeric or alphanumeric.

One step involves accessing a tokenization strategy that contains information determining a first predetermined number of characters as a head of a tokenized data string and a second predetermined number of characters as a tail of the tokenized data string. The first predetermined number of characters of the input data string is stored in a secure database as a first portion of the tokenized data string, the tokenized data string comprising an entry in the secure database. The second predetermined number of characters of the input data string in the secure database as a second portion of the tokenized data string. These lengths of the first and second portions of the data string may be chosen to meet a particular business purpose, e.g. to reveal the first three digits of a Social Security Number, or the last four digits of a credit card number.

Thereafter, a disclosed method involves parsing the input data string of the first and second predetermined number of characters of the input data string to thereby derive a remaining portion of the input data string. In accordance with an aspect of the invention, the remaining portion of the input data string is encrypted with an encryption key associated with the client process to obtain a ciphertext representation of the remaining portion of the input data string. Next, the method involves generating a token body portion corresponding to the remaining portion of the input data string, the token body portion determined by a predetermined token generation algorithm that is independent of the data values of the characters in the remaining portion of the input data string.

The ciphertext representation of the remaining portion of the input data string and the token body portion is stored as an entry in the secure database in association with the first portion and the second portion of the input data string, with the first portion of the input data string, the token body portion, and the second portion of the input data string forming a tokenized data string that has the same format as the input data string but is not cryptographically decipherable to derive the input data string.

Further according to the method, in response to a predetermined request from the client process, the tokenized data string is returned in an electronic communication to the client process.

In accordance with an aspect of the disclosure, the client process is conducted in a data processing system remotely located from the secure database, but may be conducted by a system that is independent of and has no access to a system that carries out the method.

In accordance with another aspect, a tokenization strategy is associated with the client process. Advantageously, a system and methods constructed as described herein can accommodate various different tokenization strategies for various different client processes, and for various different types of data and applications. The system accommodates different tokenization strategies for different types of data such as Social Security Numbers, financial account numbers, credit or debit card numbers, and the like. Further, the system accommodates and facilitates different tokenization strategies for different clients and/or client processes.

According to an aspect, as described above, the remaining portion of the input data string is encrypted with an encryption key to obtain a ciphertext representation of said remaining portion. This ciphertext representation is stored in lieu of the sensitive information, but can be retrieved and decrypted to retrieve the actual sensitive data, upon provision of appropriate security credentials or authorization. An exemplary related method further comprises the steps of storing a plurality of encryption keys in the secure database that are associated with a plurality of client processes, and utilizing a particular encryption key for the encrypting step that is identified with a particular client process. An exemplary related method further comprises the step of storing information in the secure database that points to an entry in a separate storage device (key manager) that stores the encryption key, and retrieving the encryption key from the separate storage device.

According to another aspect, the method is carried out in a secure server operated in a secure environment to which personnel associated with the client process do not have access.

Various methods of generating tokens are disclosed to provide flexibility in creating tokenization strategies. One such method is to provide different numbers of characters in the first portion and the second portion of the tokenized data string. Another such method is to provide different approaches to generating the token body portion. One such method involves using a token generation algorithm that provides the token body portion as a sequence number generated in the token server. Another such method involves using a token generation algorithm that generates a random number for use as the token body portion. Yet another such method involves using a token generation algorithm that provides the token as a value that is used as an index to identify an entry in the secure database.

According to another aspect, the tokenized data string is generated by the token generation algorithm to generate a tokenized data string that passes a Luhn test for a credit card number corresponding to the input data string, or deliberately fails a Luhn test, or is independent of a Luhn test.

According to another aspect, as relates to the step of calculating a unique digest of data corresponding to the tokenized data string, the method involves storing the unique digest in the secure database in association with the tokenized data string for use in rapid lookup of entries in the secure database. As will be understood, the unique digest is typically generated using one of the well known hash methodologies such as SHA-1, SHA-2, or MD5.

According to another aspect, the method further involves steps of, in response to a predetermined condition, deleting the ciphertext representation of the input data string associated with a particular tokenized data string from the secure database, leaving the tokenized data string in the secure database stored in association with the unique digest. Such a predetermined condition can include a predetermined delete command for the sensitive data, or can result from a period purge of the secure database. Further, the method involves steps of, in response to subsequent provision of an input data string of sensitive information by a client process, calculating a unique digest of the input data string using the same methodology, using said unique digest of the input data string to access the secure database to determine whether there is an entry corresponding to the input data string that contains a tokenized data string, and returning the tokenized data string to the client process.

According to another aspect, a method in accordance with the disclosure involves providing a masking operation to the tokenized data string, such that a response to the request by the client process for the tokenized data string includes one or more of the first portion or the second portion of the input data string in additional to predetermined mask values (e.g. asterisks).

According to a particular aspect of the invention, processes for tokenizing, detokenizing, and looking up of values of tokenized data strings and sensitive data are carried out by client processes that invoke an application programming interface (API) of a system constructed in accordance with the disclosure herein. In one such aspect, steps of the method are carried out in response to provision by a client process of a tokenize or "Protect" function call in association with the sensitive data string. Such a function call returns the tokenized data string to the calling client process, as described herein.

In another such aspect, steps of the method are carried out in response to provision of a Lookup with Sensitive Data function call from a client process in association with the sensitive data. Such a method involves calculating a unique digest of the input data string of sensitive data, accessing the secure database using the unique digest to determine whether there is an entry in the secure database corresponding to the input data string, and in response to a determination that the secure database contains such an entry, retrieving the tokenized data string. The tokenized data string is thus returned to the calling client process.

In another such aspect, steps of the method are carried out in response to provision of a Lookup with Token function call from a client process in association with a tokenized data string. Such a method involves accessing the secure database using the token of the tokenized data string to determine whether there is an entry in the secure database corresponding to the input data string, and in response to a determination that the secure database contains such an entry, retrieving the tokenized data string. Such a function call results in the return of a masked version of the tokenized data string to the calling client process.

In another such aspect, steps of the method are carried out in response to provision of a detokenize or "Reveal" function call from a calling client process in association with the tokenized data string. Such a method involves determining whether the calling client process has authorization to retrieve the sensitive data. In response to proper authorization for the sensitive data, the method further involves accessing the secure database using the token of the tokenized data string to determine whether there is an entry in the secure database corresponding to the input data string, and in response to a determination that the secure database contains such an entry, retrieving the sensitive data. Such a function call result in the return of the sensitive data to the calling client process.

Another aspect of the disclosure relates to systems and methods of a data tokenizing system for secure access and utilization of sensitive data that allows creation, management, and utilization of different tokenization strategies on behalf of a plurality of user entities. Such a system comprises a tokenizing strategy component for storing a plurality of predetermined tokenization strategies on behalf of a plurality of user entities. Such as system further comprises a data tokenizing component operative to (a) receive an input data string of sensitive data from a particular one of the plurality of user entities in a predetermined data format, (b) apply a selected predetermined tokenization strategy corresponding to the particular one of the plurality of user entities to the input data string to generate a tokenized data string, and (c) provide the tokenized data string for storage in association with the input data string. Such a system also further comprises a centralized secure server in communication with the data tokenizing component and including a secure database operative to store the tokenized data string and the input data string in a corresponding mapped relationship. Such a system still further comprises a security component operative to provide access to the tokenized data string and to the input data string in the secure database in accordance with a predetermined security requirement of the particular one of the plurality of user entities.

In accordance with aspects of the disclosure, the system provides a user interface that allow for creation and management of different tokenization strategies. In such a system, the user interface is configured to allow user configuration through one or more of the following: a selection field for selecting one or more portions of the input string to be replaced; a field for user selection of format preservation; an input field for entry of a test string of data; and an output field for displaying a tokenized output string of data.

Another aspect of the disclosure relates to a system and methods for secure access and utilization of sensitive data implemented for a plurality of users through cloud hosting. Such a method involves receiving user configuration of a tokenization strategy through a user interface. Subsequent to establishment of a tokenization strategy, the method involves tokenizing an input string of sensitive data in accordance with the tokenization strategy selected by the user and providing the tokenized data string for storage in a secure server.

The method further involves managing access to the secure database in accordance with predetermined security requirements. The method further involves managing authorization for performing one or more administrative functions based on quorum-based authorization including defining users authorized to perform the administrative functions, defining a criterion requiring a minimum number of the authorized users to provide permission for performing an administrative function, receiving a request for performing an administrative function, determining whether the criterion is met, and performing the requested administrative function if the criterion is met. Further aspects require users to provide permission for performing an administrative function by entering a password. Further aspects involve steps wherein the users are defined at both the client and the centralized secure server and further, the criterion requires a minimum number of users at both, the client and the centralized secure server.

Further aspects of the disclosure relate to providing the invention via an article of manufacture, namely, a computer program product that embodies software that carries out steps of the various methods described herein, and wherein such software is executed on a computer system that includes a processor for executing the computer program code. The computer program product is preferably provided on a computer readable medium, preferably nonvolatile.

According to yet another aspect, the disclosure relates to a user customizable data tokenizing system for secure access and utilization of sensitive data by a user. Such a system comprises a data tokenizing component operative to (a) receive an input data string of sensitive data from a user in a predetermined data format, (b) apply a selected predetermined tokenization strategy to the input data string to generate a tokenized data string, and (c) provide the tokenized data string as an output for storage in association with the input data string. The system further comprises a tokenizing strategy generation component operative to receive user input corresponding to a plurality of tokenizing parameters that is operative for generating a tokenization strategy utilizing the values of the tokenization parameters input by the user. Further, such a system comprises a tokenization strategy storage for storing the predetermined tokenization strategy in association with information identifying the user.

According to yet another aspect, the present disclosure relates to a method for utilization by a user of tokenized data in substitution of sensitive data in a computer-implemented transaction processing operation so as to protect the sensitive data from unauthorized access. Such aspects contemplates that the protection of the sensitive data will be carried out by systems and methods as described herein, working in conjunction with an enterprise data processing or transaction processing system, so as to carry out business processes of the enterprise, utilizing its existing data processing infrastructure, while securing sensitive data from unauthorized access or misuse, and in many cases, wherein the tokenized data string is used in substitution of the sensitive data for various enterprise data processing and business processing function.

According to this aspect, the method involves providing a predetermined tokenization strategy in a tokenization system on behalf of a user (e.g. an enterprise user independent of an operator a system for securing the sensitive data as describe herein) for a particular type of sensitive data, e.g. credit card numbers, Social Security Numbers, and other herein described forms of sensitive data. The sensitive data is derived in connection with a particular transaction of the enterprise and provided to the tokenization system for tokenization in accordance with the predetermined tokenization strategy. The tokenization system provides the enterprise with a tokenized data string representing the sensitive data involved in the particular business transaction. The tokenized data string corresponding to the particular transaction is stored by the enterprise in association with other information relating to the particular transaction in a data processing system of the enterprise. The enterprise is thereby enabled and operative to process information relating to the particular transaction in its transaction processing operations without use of or reference to the sensitive data.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment. The drawings are illustrative in nature and are not necessarily drawn to scale.

FIG. 1 illustrates an exemplary system for secure access and utilization of sensitive data.

FIGS. 2A, 2B, and 2C depict examples of tokenized strings.

FIGS. 3A and 3B illustrate utilization of tokenization within a business process.

FIGS. 4A and 4B illustrate an exemplary method for secure access and utilization of sensitive data, according to one of the embodiments of the present disclosure.

FIGS. 5A-5D is a flowchart depicting an exemplary method for validating a user's authorization and tokenization of an input string based on a tokenization strategy.

FIGS. 6A and 6B depict an exemplary method for performing a lookup function.

FIGS. 7A and 7B illustrate an exemplary a method for retrieval of an input string of sensitive data corresponding to a tokenized string from the secure database.

FIG. 8A is an exemplary database schema showing an exemplary database table and associated fields stored at a client application before tokenization.

FIG. 8B is an exemplary database schema an exemplary database table showing and associated fields stored at the client application of FIG. 8A, after tokenization.

FIG. 9 illustrates an exemplary database schema of a table in the secure database.

FIG. 10A is an exemplary encryption management screen for managing encryption key functions such as key activation, expiration, rotation, etc., as described in connection with FIG. 5C.

FIG. 10B is an exemplary screen for configuring a tokenization strategy, as described in connection with FIG. 2C.

FIG. 10C illustrates an exemplary screen for allowing a user to configure details of a tokenization strategy, as described in accordance with FIGS. 1-5D.

FIG. 10E is an exemplary screen facilitating definition of a client.

FIG. 11 illustrates an exemplary method for secure access and utilization of sensitive data in a business process, in accordance with one of the embodiments of the present disclosure.

FIG. 12 depicts an exemplary method executing within a cloud-hosted system, for secure access and utilization of sensitive data.

DETAILED DESCRIPTION

Figure 10D:
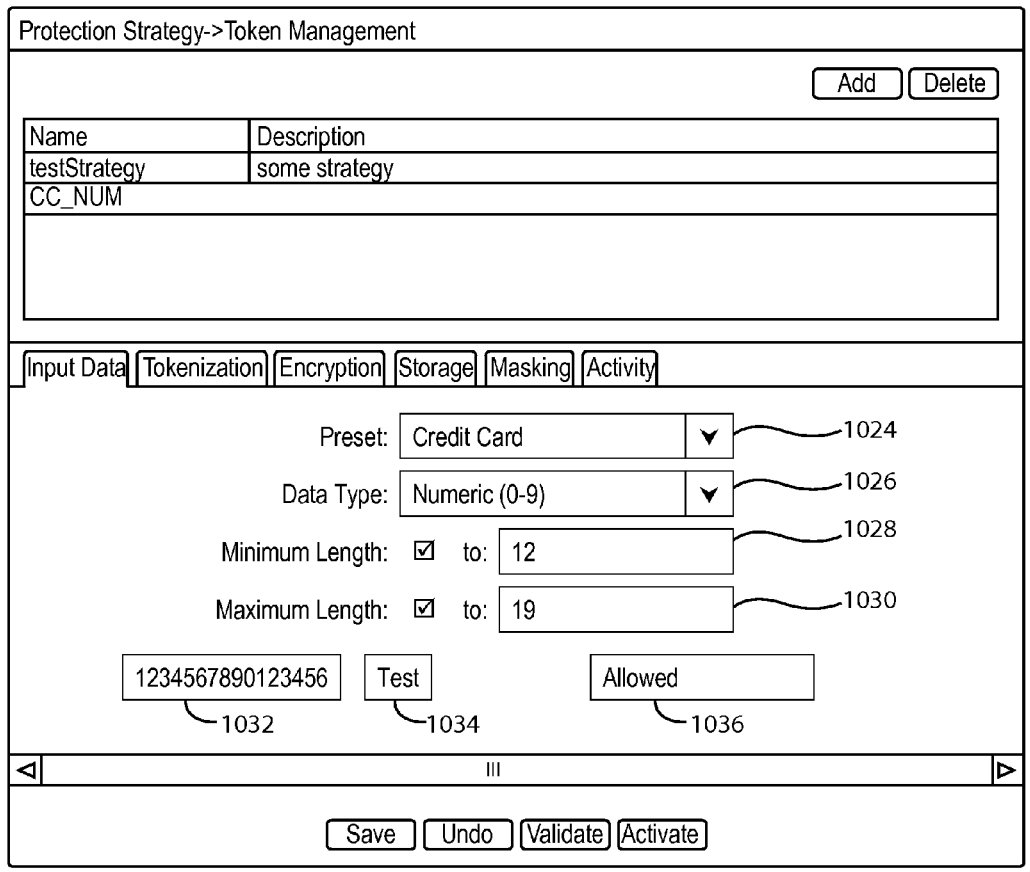
FIG. 10D illustrates another exemplary screen for allowing a user to configure a tokenization strategy and validate details of the input string, as described in accordance with FIGS. 5A-5D.

For promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. Limitations of scope should be determined in accordance with and as expressed in the claims.

Overview

Briefly described, aspects of the claimed invention relate to systems and methods for secure access and utilization of sensitive data. The various embodiments of the disclosure provide protection for sensitive information (such as credit card numbers, personally identifiable information, or electronic health records) that may be communicated, stored, or processed in computer systems and networks, such as those in an enterprise. The sensitive information may be replaced by representative surrogate data (referred to as tokenized data or strings) that is distributed in place of the original data throughout an enterprise or network, while the sensitive information itself stored in a secure server.

Exemplary System

FIG. 1 illustrates an exemplary system 100 for secure access and utilization of sensitive data. The system 100 is designed for protecting sensitive user information, such as an identification number (for example, driver's license number, social security number, passport number, etc.); personal verification information (for example, date of birth, mother's maiden name, etc.); contact information (for example, phone number, email address, etc.); health-related information (such as medical records); biometric data (fingerprint, handwriting, and the like.); vehicle-related data (for example, vehicle registration number, etc.); or a financial account number (for example, credit/debit card number, bank account number, security PIN, etc.). It will be understood by those in the art that the provided examples are not limiting and other sensitive data may be employed in the present embodiment, without departing from the scope or purpose of the claimed invention. Further, the system 100 may be part of an enterprise system or accessible through cloud hosting, as will be described in more detail in connection with FIG. 12.

The system 100 may receive sensitive information through several different applications. Some examples presented in FIG. 1 include receiving payment card 102 information from a customer at a web server 104 during a web transaction; receiving similar information through a point of sale (POS) entry device 106; or receiving the information through a phone order entry device 108 being operated by, for example, a retail employee, while placing an order for the customer. The payment card 102 maybe any known type such as MasterCard, VISA, AMEX, etc. The POS can be a payment point at a merchant's business site, where a customer presents a payment card for purchase or rental of goods and services. The point of sale device 106 may include, for example, a payment interface at a gas pump a cash register, a hotel front desk, a bank's computer system, or the like.

The sensitive information, here, the payment card 102 information, is received as an input string by a token management system 110 through a front-end interface 112. As will be explained in more detail, the sensitive information may be stored in encrypted form in a secure location, while a tokenized version of the information is distributed throughout an enterprise in its place. The encryption may be performed by applying any encryption algorithm known in the art such as AES, blowfish, etc., or hashing.

In one implementation, a key manager 124, part of the token management system 110, manages the encryption keys. The front-end interface 112 communicates the payment card 102 information to the key manager 124, which encrypts the payment card 102 information and forwards the encrypted information, along with the payment card 102 information, to a tokenization component 118.

The tokenization component 118 is in communication with a user interface 120 for receiving user configuration of a tokenization strategy, which is applied to the payment card 102 information. The user here is described as an entity capable of configuring a tokenization strategy, which allows definition of certain validation parameters, access rights, and tokenization rules, for tokenizing an input string, described in more detail in connection with subsequent figures. The user may be an individual (for example, an administrator of a computer system), or a computer program.

The tokenization component 118 can apply the tokenization strategy selected by the user to the payment card 102 information to generate a tokenized string and can provide the tokenized string for storage. The tokenized string may be stored in a secure database 128 within a secure server 126, which is in communication with the tokenization component 118. The secure database 128 stores the tokenized string and the encrypted payment card 102 information, with a mapping between the two, in a table or suitable data structure. In this manner, the sensitive information is securely stored, and the corresponding tokenized string can be distributed to all desired systems in its place, such as corporate applications 130. These corporate applications 130 can include a store's business analytics system, a hotel reservation system, a human resource customer service system, etc.

In one implementation, the tokenization strategy preserves the format of the input string of sensitive information (such as one or more portions of the input string, the length of the input string, or the type of data characters in the input string) but is not decipherable to derive the input string from the tokenized string. Here, the entire or a portion of the input string may be replaced with a second string.

If the input string needs to be retrieved for processing by one of the corporate applications 130, the tokenized string corresponding to the sensitive string may be provided to the token management system 110, which can access the secure database 128. A security component 122, in communication with the secure server 126, manages access to the secure database 128 in accordance with predetermined authorization procedures and access control, as described in detail in connection with FIGS. 4A-5D, 10A-10G, and 12.

FIGS. 2A, 2B, and 2C depict examples of tokenized strings. All three examples divide an input string 202 into three parts—a head 204A a body 204B, and a tail 204C. The head 204A consists of the first four characters of the input string, the tail 204C consists of the trailing four characters, and the body 204B consists of the remaining seven characters in the middle of the head and tail portions. The tokenization strategies of FIGS. 2A, 2B, and 2C preserve the head and tail, while replacing the body with another string of characters. In FIG. 2A, the tokenization strategy preserves the data character type of the input string 202, which is numeric in this case. The seven numeric characters in the body 204B of the input string 202 are simply replaced with a string of seven numeric characters in the tokenized string 204. The tokenization strategy also preserves the length of the input string 202.

In FIG. 2B, the body 208B (including seven numeric characters) of the input string 202 is replaced by eight alphanumeric, characters in the tokenized string 208. Alternatively, in FIG. 2C, the body 212 B of the input string 202 is replaced by seven special characters (e.g. asterisks ******* in this case) in the tokenized string 212.

The tokenized strings can simply be returned to the corporate applications 130. For example, in a human resource customer service application handling social security numbers, an customer service representative may only require access to the last four digits for processing certain customer requests. Thus, the representative may be allowed to view only the tokenized strings Preserving the format may allow existing business systems to process the tokenized strings in the same manner as the original input strings, thus requiring very little or no change in the business system architecture.

It will be clear to those skilled in the art that the size of these fields may vary depending on system requirement without departing from the scope of this disclosure. Further, although the present example only allows selection of the lengths of the head and tail portions of a string, in other implementations, any portion of the string may be selected for replacement by another string. Further, tokenization may be performed with any combination of numeric, alphabetic, or special characters in other implementations. The string that replaces the remaining characters (characters in the string other than the ones being retained) may be generated through sequential indexing, random indexing, or based on a predetermined algorithm.

FIGS. 3A and 3B illustrate tokenization within a business process. Businesses perform business analytics on transaction information gathered over time. Individual transactions are associated with an input string of customer information, such as a credit card number, and all associated transactions can later be analyzed to extract business intelligence. utilizing tokenization, it is possible to perform the same business analytics without using sensitive customer information at all.

FIG. 3A displays an exemplary conventional interface 302 of a store's business analytics application. The interface 302 displays recent transactions associated with a credit card number '3752 5712250 3125' and this information may be utilized for business analytics. It should be noted however, that the application contains sensitive credit card information, which can be easily obtained by a malicious attack on the application.

FIG. 3B shows an exemplary interface 304 utilizing tokenization. Here, the credit card number '3752 5712250 3125' is replaced with a tokenized string '3752 4333906 3125'. When a transaction is processed at the store, for example through the swiping of a credit card, the credit card processing system associates the transaction with the tokenized string. The application stores the transaction information for subsequent use, to provide business intelligence, as explained below. The sensitive credit card information is stored remotely in the secure database 128.

The interface 304 shows that a customer purchased a printer on Dec. 21, 2010; this information is stored as transaction information related to the tokenized string. Subsequently, on Feb. 25, 2011, the customer purchased paper and an ink cartridge from the store, and these transactions are also stored as transaction information. The store can now utilize the transaction information associated with the tokenized string for business analysis, determining for example, the average time after which customers return for ink or paper, after purchasing a printer.

Such business analysis can be performed without the application having access to the credit card numbers of customers. Even if this application is compromised, the sensitive credit card information cannot be accessed and remains protected in the secure database 128.

With tokenization, the method used to generate the tokenized values may also provide referential integrity. That is, the system can ensure that each input string corresponds to a unique tokenized string. This is applicable, for example, while monitoring transactions on a credit card, where the transactions are associated with the tokenized string corresponding to the credit card. In this case, it may be preferable that the tokenized string is linked with only one credit card number and vice versa. Thus, the tokenization of input strings enables referential integrity to be maintained, which facilitates certain business analytics.

Exemplary Methods

The following sections describe exemplary methods for carrying out one or more embodiments of the present disclosure. The methodology described herein is generally intended to describe various features and functionality of various system components described previously. The order in which the method steps are described is not intended to be construed as a limitation, and any number of the described method blocks can be combined in any order to implement the method, or an alternate method. Additionally, individual blocks may be deleted from the methods without departing from the spirit and scope of the subject matter described herein. Furthermore, the method can be implemented in any suitable hardware, software, firmware, or combination thereof.

FIGS. 4A and 4B illustrate an exemplary method 400 for secure access and utilization of sensitive data, according to one of the embodiments of the present disclosure. The method 400 executes within the system 100 of FIG. 1. Here, the tokenization strategy is already defined, which will be described in more detail in connection with FIGS. 5A-5D and 10D-10G.

When an input string of sensitive data is received from a client, it is tokenized based on the tokenization strategy. It should be understood here that the client might be an individual operating an application, such as the ones described in FIG. 1. At step 402, an input string of sensitive data is received from a client, and a request for tokenization of the input string is made. Critical to the security of such requests is ensuring that the client applications have the appropriate authority to make the requests, preventing rogue client applications and associated persons from gaining access to the sensitive information. The user is authenticated (described further in FIGS. 4A-5D, 10A-10G, and 12) by the security component 122 at step 404 and then, the method 400 applies the tokenization strategy to the input string (step 406) to generate a tokenized string, as discussed in connection with FIGS. 2A-2C and 3A-3B. At step 408, the tokenized string is provided for storage to the secure database 128 and subsequent access. The secure database 128 stores the tokenized string and the input string, with a mapping between the two. The tokenized string may be returned to the client for replacing the input string in the client's applications.

Further, the input string may be encrypted before storage. Encryption keys are centrally managed (including functions such as key generation, rotation, revocation, etc.) and securely distributed to each requiring system where decryption is required by the key manager 124. Moreover, the secure database 128 can include a key profile, which provides a pointer to the encryption key used to encrypt a particular input string, as will be discussed in more detail in FIG. 9.

The method 400 also supports a lookup function for allowing a client to determine whether a particular tokenized string already exists within the secure database 128, as will be described in more detail in FIGS. 6A and 6B. At step 410, the method 400 receives a lookup request from the client. The request may include a tokenized string for which the lookup is to be performed, or the request may include the sensitive data itself so as to determine whether a token for that particular sensitive data is already extant in the database. Stated in other words, and by way of example, a client process can submit a credit card number (sensitive data) and ask for a lookup to determine whether a token already exists or not for that credit card number. According to one aspect of the invention, the system will not tokenize the sensitive data if a token does not exist, but will instead return a message noting that no token exists for this particular sensitive data. According to another aspect, the system will return the previously-created tokenized data string corresponding to the sensitive data.

The method 400 looks up the secure database 128 to determine whether the tokenized string is present (step 412). Then, the connector A leads to step 413, where if not tokenized string is identified, the request is rejected at step 414, and the method 400 may display a rejection message to the client (step 416). If however, the tokenized string is identified within the secure database 128, given that the requesting client is an authorized client, the tokenized string is returned to the client at step 418.

Once the sensitive data is stored securely, authorized clients may retrieve it for application in business processes, for example. The retrieval of an input string corresponding to a tokenized string will be discussed in more detail in FIGS. 7A and 7B. At step 420, the security component 122 receives a request for retrieving the input string corresponding to a tokenized string. The security component 122 determines whether the requesting client is authorized, at step 422 and also determines the client's access rights, at step 424. If the access rights are sufficient, the method 400 looks up the secure database 128 at step 426 and retrieves the corresponding input string at step 428. The input string may be in encrypted form in the secure database 128, and may require decryption. The decrypted input string is then returned to the requesting client.

It should be noted that the method 400 could execute within an enterprise computer system or through cloud hosting, which will be described in more detail in connection with FIG. 12.

Access rights may be defined individually for a user, which may be an individual or an application. Alternatively, user groups may be defined, where each group has certain access or authorization rights, which apply to each user within the group. In one embodiment, access control may be hierarchical in nature, where a top-level supervisor has access to the secure database 128, while lower level personnel have access to only the tokenized data. Further, access may require verification, through for example, a user name, and password. Access control and authorization are described in more detail in connection with FIGS. 4A-5D, 10A-10G, and 12.

Consider an example of a loss prevention application that identifies potential fraud, in case a credit card number is used for two transactions in two distant locations within a short period of time. The users of the application will have access to only the tokenized strings and will compare the tokenized strings for fraud detection. Only a few users, belonging to higher management, may have access to the secure database 128. Thus, fraud detection may be performed even though most application users no longer have access to the credit card numbers. Employing the embodiments of the present disclosure, such applications can use tokenized strings instead of the actual credit card numbers for fraud detection, while the sensitive credit card numbers are stored in the secure database 128.

FIGS. 5A-5D is a flowchart depicting an exemplary method 500 for validating a user's authorization and tokenization of an input string based on a tokenization strategy. At step 502, the method 500 accepts a user's credentials and determines whether the user is an administrator with the acceptable authorization, at step 504. If the user is not an administrator, at step 506 the method 500 informs the user that they have insufficient rights for configuring the tokenization strategy.

In order to validate the authorization of a user, the method 500 may employ various suitable factors including IP address and IP address range, client 'API key' or certificate, role validation and time validation. It will be apparent to those of skill in the art that these factors are not limiting and are purely illustrative in nature. At step 508, the method 500 accepts and validates the API key from the user that identifies requests originating from a client application. The method 500 also accepts the originating IP address or hostname from the user and confirms whether the user has a valid IP address and/or valid IP range or hostname (step 510). At steps 512 and 514, the method 500 accepts the name of the script that will communicate with the tokenization component 118, and it accepts the email address of the user executing the script, respectively.

Connector A leads to step 516 of FIG. 5B, where API permissions are displayed to the user. Permissions for actions that clients may execute are defined; for example, a valid client may only perform the lookup function, as opposed to another client, which may tokenize data or retrieve sensitive information from the secure database 128. Examples of other permissions will be shown in FIG. 10G.

At step 518, the user may select to perform a single request function or a bulk request function. If the client application needs to perform a function on a unit of data, single request processing is assigned to the script, at step 520. Alternatively, the user may select bulk processing, which would assign bulk request processing to the script at step 522. Bulk processing allows, for example, multiple input strings to be submitted for tokenization at a time, saving the time required for making individual requests. This may be especially suitable for the initial tokenization process of a system (e.g., historical data) as well as ongoing business operations that require this functionality (e.g. end of day settlement processing). At step 524, the tokenization function is selected from the list of functions and at step 530, the tokenization function is assigned with the script.

Connector B leads to step 532 of FIG. 5C, where other constraints are defined, for example, clients may be validated based on the time of their request. For instance, a retail store may only be able to make valid request between 9 am and 9 pm PST and so, requests outside this period should not be accepted and are considered invalid. It will be clear to those of skill in the art that other constraints may also be added for validation purposes.

At step 534, the user selection of an encryption algorithm for encryption of the input string is accepted. Employment of multiple keys may be desired within a system for added security, and standardized key rotation requirements known in the art may necessitate that multiple keys be used. The method 500 may set effective dates for encryption key usage and expiration dates for these encryption keys. When encryption is to occur, the key manager 124 determines which key is currently active based on the data being encrypted and the key associated with the current date, shown in more detail in FIG. 10A. At step 536, the method 500 accepts details such as effective or expiry dates of encryption keys.

At step 538, the method 500 accepts configuration of the tokenization strategy and saves the configuration at step 540. Further, at step 542 the user enters an input string, which is validated by the method 500. Some examples of this configuration and validation are provided in FIGS. 10A-10G.

Connector C leads to step 558 of FIG. 5D, where a lookup function is performed by the method 500 in the secure database 128 to determine whether the tokenized string for the input string already exists (step 560). If the tokenized string is found, it is returned to the client application at step 562. If not, the method 500 applies the tokenization strategy at step 564. The input string may be encrypted using the encryption algorithm before storage. In this case, the key manager 124 looks up the corresponding encryption key and encrypts the input string (step 566). At step 568, the tokenized string and the encrypted input string are stored in the secure database 128 with a mapping between the two. The method 500 proceeds to step 562, where the tokenized string is returned to the client application and subsequently, the tokenization is logged at step 570 within the token management system 110 or an external log management system.

FIGS. 6A and 6B depict an exemplary method 600 for performing the lookup function, as mentioned in the method 400. At step 602, the method 600 receives a client application's request for lookup of a tokenized string corresponding to an input string. The client application is authenticated and the input string is validated, as described in connection with FIGS. 5A-5D, at step 604 and 606, respectively.

At step 608, the method 600 looks up the secure database 128 for a tokenized string corresponding to the input string. Connector A leads to FIG. 6B, where if the tokenized string is found, at step 610, it is returned to the client application at step 614. Otherwise, the method 600 displays a message informing the user of the client application that the tokenized string is not present in the secure database 128 at step 612. After steps 614 or 612, the method 600 logs the lookup operation at step 616 within the token management system 110 or an external log management system.

FIGS. 7A and 7B illustrate an exemplary method 700 for retrieval of an input string of sensitive data corresponding to a tokenized string from the secure database 128. At step 702, the method 700 receives a client application's request for retrieving an input string corresponding to a tokenized string provided by the client application. The client application is authenticated as described in connection with FIGS. 5A-5D, at step 704. If it is determined, that the client application is not authorized at step 706, the request is rejected at step 708, and a rejection message is displayed to the client 710. Otherwise, if the client application is authorized, the method 700 proceeds to step 714, where the method 700 determines whether the user associated with the client application has sufficient access rights. If not (step 716), the method 700 proceeds to steps 708 and 710. Sufficient access rights may include verifying whether the user has access to tokenization strategy related to the requested input string. For instance, if the input string is a credit card number, then the method 700 verifies whether the client application has access to retrieve credit card numbers, as is specified in the tokenization strategy related to the input string (credit card number). This may be done by linking client applications or associated users with the tokenization strategies they have access rights to.

If the user does have sufficient access rights (step 716), the method 700 performs database lookup at step 718, as described in connection with FIGS. 6A and 6B. If the corresponding input string is found, the method 700 proceeds to step 720. Here, the input string may be stored in encrypted form. In this case, at step 720, the encryption is key is looked up through the key profile (as described in FIGS. 4A, 4B, and 9). If the corresponding input string is not found, the method 700 may display a message informing the user that the input string no longer exists in the secure database 128.

At step 722, the input string is decrypted and at step 724, the method 700 returns the decrypted string to the client application. The method 700 may return either the original input string in decrypted form or may return a masked form of the input string (for example, the body of the input string being replaced by '*') based on the user's access rights. For instance, is the user is a supervisor of a store, their access rights may allow access to the original input string, while for a lower level employee, the access may be limited to the masked form of the input string. At step 726, the retrieval operation is logged within the token management system 110 or an external log management system.

It should be noted that the described retrieval operations can be processed in bulk, in a manner similar to that described in connection with FIG. 5B.

Exemplary Database Schemas

FIG. 8A is an exemplary database schema showing an exemplary database table 800A and associated fields stored at a client application before tokenization. The name of a customer in this example is associated with the customer's credit card number. As will be apparent, a rogue application attacking the client application can gain access to customers' sensitive credit card information.

FIG. 8B is an exemplary database schema an exemplary database table 800B showing associated fields stored at the client application of FIG. 8A after tokenization. Here, the credit card numbers are replaced with corresponding tokenized strings. In this example, each tokenized string retains the length, the data character type (numeric), and the first four and last four characters of the corresponding credit card number. An attack on the client application in this case will only have access to the tokenized strings and not the sensitive credit card information.

FIG. 9 illustrates an exemplary database schema of a table 900 in the secure database 128, where the table has the following fields. The table includes the tokenized strings 902, which serve as an index from the table 800B. Further, the table 900 includes encrypted versions of credit card numbers (encrypted input strings 906) from the table 800A. A key profile 908 provides a link to the encryption keys used to generate the encrypted input strings 906, while the encryption keys themselves are stored in a secure location. The table 900 also includes a hash 904 field, including hash values of the credit card numbers. The next time a credit card number is looked up, it is hashed, and this hashed value is compared with the hash 904 field within the table 900, to determine whether a tokenized string is already present for the credit card number. It will be understood by those skilled in the art that variations and alternatives of the discussed fields and inclusion of other fields of information are also possible, without departing from the scope of purpose of the claimed invention. For example, the tokenized string field may be replaced with three fields—each field representing the head, the body, or the tail of the tokenized string.

Exemplary User Interface Screens

The exemplary screens described below may form part of the user interface 120. Further, it will be understood that the exemplary screens do not limit the scope of the claimed invention, but are included merely for illustrative purposes.

FIG. 10A is an exemplary encryption management screen 1000A for managing encryption key functions such as key activation, expiration, rotation, etc. as described in connection with FIG. 5C. Through screen 1000A, an authorized user can manage user access rights for performing functions related to key management. Keys may be added, deleted, or disabled. Moreover, the screen 1000A shows information related to a key, such as the activation and expiration dates, the applicable encryption algorithm, whether the key is active, etc.

FIG. 10B depicts an exemplary screen 1000B for configuring a tokenization strategy, as described in connection with FIG. 2C. The screen 1000B provides a 'show leading' input field 1002 and a 'show trailing' input field 1004. These fields allow a user to specify length of head and tail portions of the input string that will be retained. The remaining characters in the input string will be tokenized or in this case, replaced with '*' characters. The 'mask' input field 1006 allows the user to provide the input string and pushing the 'test' button 1008 displays the tokenized string in the output field 1010.

FIG. 10C illustrates an exemplary screen 1000C for allowing a user to configure details of the tokenization strategy, of the type described in FIGS. 1-5D. The screen 1000C provides a format preserving tokenization checkbox 1012, which allows the user to choose preservation of the format of the original input string. The 'preserve head' input field 1014 and the 'preserve tail' input field 1016 allow a user to specify the length of the head and tail portions of the input string that will be retained. The remaining characters in the string are tokenized, or in this case, replaced with a random string of numeric characters. The user enters the input string into the 'tokenize' input field 1018 and pushes the 'test' button 1020. In response, the tokenized string is displayed in the output field 1022. Besides the options provided to the user while configuring the tokenization strategy, which are described here, other options may be available to the user. For example, the user may be able to choose to include delimiters to segregate sections of the tokenized string, such as separating the head, body, and tail of the tokenized string by '|' symbols; or the user may choose to have the generated tokenized string be Luhn compliant.

It should be noted that no mathematical relationship may exist between the input string and the tokenized string, preventing derivation of the input string from the tokenized string, as may be possible with encrypted or hashed values.

FIG. 10D illustrates another exemplary screen 1000D for allowing a user to configure the tokenization strategy and validate details of the input string, as described in accordance with FIGS. 5A-5D. A preset field 1024 allows the user to preset an input string format, such as specifying that it is a credit card number, social security number, etc. The data type field 1026 allows the user to specify whether the input string is numeric, alphabetic, alphanumeric, etc. The minimum length field 1028 and the maximum length field 1030 relate to the expected length of the input string. The user enters the input string in the input field 1032 and pushes the test button 1034. In response, the tokenization component 118 validates the input string based on the specification in the fields and specifies whether the format of the input string is correct in the output field 1036. In this manner, the format of the input string may be validated. It will be understood by those in the art that other aspects of the input string may also be validated without departing from the scope of the claimed invention.

It is clear that the length of these fields may vary depending on system requirements, without departing from the scope of this disclosure. Further, although the present example allows selection of head and tail portions of a string, other implementations may select any portion of the string for tokenization. Further, any combination of numeric, alphabetic, or special characters may be used for tokenization.

Figure 10F:
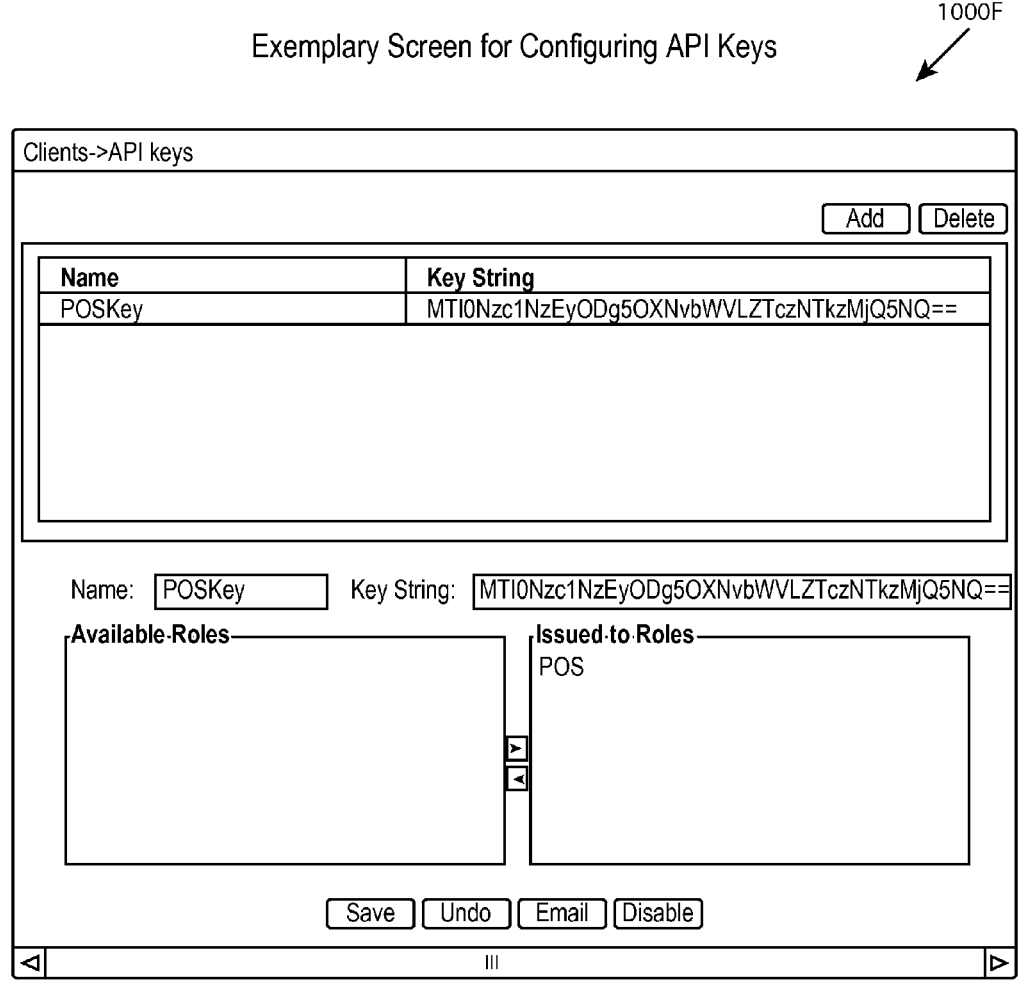
FIG. 10F shows an exemplary screen for configuring API keys.
Figure 10G:
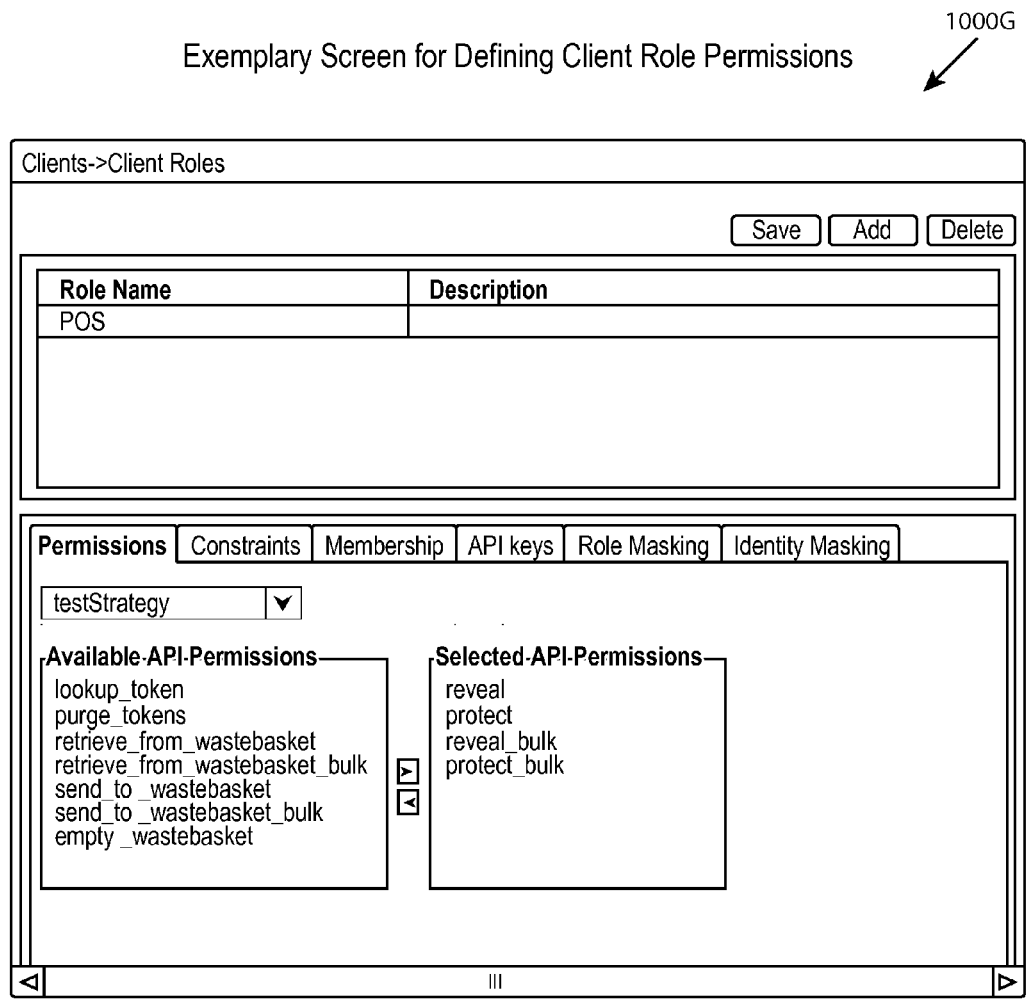
FIG. 10G depicts an exemplary screen that displays a list of API permissions to a user defined as having a particular client role (or user group).

FIGS. 10E-10G show exemplary screens of the user interface 120, showing the set up of authorization and access information, as discussed in connection with FIGS. 5A-5D. FIG. 10E depicts an exemplary screen 1000E facilitating definition of a client. The saved client information including name, hostname/IP address, email address, and client role (referred to as user group in FIG. 4B), although other client information may be saved in other implementations. When a client request is made, this saved client information can be employed for authorization.

FIG. 10F shows an exemplary screen 1000F for configuring API keys. The screen 1000F shows how a unique API key is generated for each user (or a set of users), associated with a client application, such as a POS in the present case. The API key accompanies requests made by the client.

FIG. 10G presents an exemplary screen 1000G that displays a list of API permissions to a user defined as having a particular client role (or user group). A subset of the API permissions can be selected and assigned to a particular client role. For example, in the screen 1000G, the client role 'POS' has permissions to perform reveal (retrieval of an input string from the secure database 128 corresponding to a provided tokenized string, protect (tokenization of an input string, reveal bulk (a bulk reveal function), and protect bulk (a bulk protect function) functions.

Tokenization within Business Processes

For many processes within a business, individuals do not need access to the original input string of sensitive data, but rather require viewing only a portion of the original input string. For instance, to validate a credit card or a social security number, many employees (for example, within a customer service business unit) only need to view the last four digits of the number. Therefore, systems that once housed either original input string values or their encrypted forms, need only house tokenized versions of the input strings, thus greatly reducing the risk if those systems are compromised. Furthermore, many of the systems, which are recipients of the tokenized strings, no longer have authorization to exchange the tokenized string for the original input string and therefore, risk of unauthorized access is reduced significantly for those systems.

FIG. 11 illustrates an exemplary method 1100 for secure access and utilization of sensitive data in a business process, in accordance with one of the embodiments of the present disclosure. Moreover, the method 1100 describes the interaction between the system 100 and the business process.

An input string of sensitive data is received at a client application in connection with a transaction, for example, when a credit card is swiped at a merchant site. At step 1102, the client application requests a lookup in the secure database 128 (described in FIGS. 6A and 6B) to determine whether a tokenized string already exists for the input string. If at step 1104 it is determined that the tokenized string exists, the client application receives the tokenized string from the secure database 128 at step 1106, and stores it in associated tables in the client application at step 1108, as shown in FIG. 8B. If however, the tokenized string is not present in the secure database 128, the input string is sent to the token management system 110 for tokenization at step 1110, as described in FIGS. 5A-5D. The client application then receives the tokenized string at step 1112 and stores it in the associated tables at step 1108.

Later, at step 1114 the client application can request retrieval of the input string, from the secure database 128, corresponding to the tokenized string. If the client application and the requesting user are determined to have sufficient authorization and access rights (determined at step 1116), the input string is retrieved from the secure database 128 and provided to the client application (step 1118), as described in FIGS. 7A and 7B. Otherwise, a simple lookup function may be performed by invoking process 600 (as described in FIG. 6 above) and the client application may be informed whether the input string is present in the secure database 128.

Implementation Through Cloud Hosting

The system 100 may be implemented through cloud hosting, for secure access and utilization of sensitive data, according to one of the aspects of the present disclosure. FIG. 12 depicts an exemplary method 1200 for execution within a cloud-hosted system, where the tokenization component 118, the key manager 124, and the secure server 126 are present on a cloud network implemented through cloud hosting. The client site includes the security component 122, the front-end interface 112, and the user interface 120 through which users access all the components of the cloud-hosted system. It will be understood by those in the art that the components of the system 100 present on the cloud network and the client site may vary. For example, the security component 122 may be hosted on the cloud network instead.

The steps of the method 1200 that are similar to the steps of the methods described in the present disclosure are not repeated here. As the sensitive data is stored outside enterprise boundaries, requiring transmission of the sensitive data between the client site and the cloud network, the cloud-hosted system may be augmented with another security layer, referred to as 'quorum-based authorization'. It will be clear to those in the art that although this security layer is described in connection with a cloud-hosted system, it may be applied to any system such as an enterprise computer system.

FIG. 12 is a flow chart setting out a quorum-based authorization technique, described in terms of performing administrative functions, such as key generation, rotation, destruction, etc. This technique may also be applied for controlling access to other tasks as well, such as accessing log information.

At step 1202, the method 1200 defines a certain number of users, on the client site as well as the secure server 126 site, authorized to perform an administrative function. Further, the method 1200 defines a criterion (step 1204) requiring a minimum number of the authorized users (at the client site as well as the secure server 126 site) to provide permission for performing the administrative function. For instance, the method 1200 defines five users on the client site and five users on the secure server 126 site authorized to perform an administrative function. Further, of the ten authorized users, the method 1200 defines that a minimum of three users from the client site and two users from the secure server 126 site must provide permission for performing the administrative function. In one implementation, the authorized users may provide permission by presenting a username and password.

At step 1206, the method 1200 receives a request for performing the administrative function and then at step 1208, determines whether the defined criterion is met. If the criterion is not met, the request is denied at step 1210; otherwise, at step 1212, the method 1200 performs the requested administrative function.

Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor. Method steps according to the claimed invention can be performed by a programmable processor executing a program of instructions to perform functions of the claimed invention by operating based on input data, and by generating output data. The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The specification has described systems and methods for secure access and utilization of sensitive data. The foregoing description of the exemplary embodiments has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the systems and their practical application to enable others skilled in the art to utilize the systems and various embodiments and with various modifications as are suited to the particular use contemplated. Alternative embodiments will become apparent to those skilled in the art to which the present disclosure pertains without departing from their spirit and scope. Accordingly, the scope of the present inventions is defined by the appended claims rather than the foregoing description and the exemplary embodiments described therein.

What is claimed is:

1. A method for format preserving tokenization of sensitive data for use in a computer-implemented data processing operation so as to protect the sensitive data from unauthorized access by persons not having authorization to the sensitive data, the sensitive data provided in an input data string having a predetermined number of characters, comprising the computer-implemented steps of:
   receiving an input data string from a client process corresponding to sensitive data derived in connection with the client process for tokenization;
   accessing a tokenization strategy that contains information determining a first predetermined number of characters as a head of a tokenized data string and a second predetermined number of characters as a tail of the tokenized data string;
   storing the first predetermined number of characters of the input data string in a secure database as a first portion of the tokenized data string, the tokenized data string comprising an entry in the secure database;
   storing the second predetermined number of characters of the input data string in the secure database as a second portion of the tokenized data string;
   parsing the input data string of the first and second predetermined number of characters of the input data string to thereby derive a remaining portion of the input data string, the remaining portion comprising characters, each having an original value;
   encrypting the remaining portion of the input data string with an encryption key associated with the client process to obtain a ciphertext representation of the remaining portion of the input data string;
   generating a token body portion corresponding to the remaining portion of the input data string, the token body portion determined by a predetermined token generation algorithm that is independent of the data original values of the characters in the remaining portion of the input data string;
   storing the ciphertext representation of the remaining portion of the input data string and the token body portion in the secure database in association with the first portion and the second portion of the input data string, with the first portion of the input data string, the token body portion, and the second portion of the input data string forming a tokenized data string that has the same format as the input data string but is not cryptographically decipherable to derive the input data string;
   receiving a Lookup With Sensitive Data function call from the client process in association with the step of receiving an input data string sensitive data;
   calculating a unique digest of the input data string;
   accessing the secure database using the unique digest to determine whether there is an entry in the secure database corresponding to the input data string;
   in response to a determination that the secure database contains such an entry, retrieving the tokenized data string associated with the input data string; and
   returning the tokenized data string associated with the input data string to the client process.

2. The method of claim 1, wherein the input data string is numeric.

3. The method of claim 1, wherein the input data string is alphanumeric.

4. The method of claim 1, wherein the client process is conducted by a data processing system remotely located from the secure database.

5. The method of claim 1, wherein the client process is conducted by a data processing system that is independent of and has no access to a system that carries out the method.

6. The method of claim 1, wherein the tokenization strategy is associated with the client process.

7. The method of claim 1, wherein the tokenization strategy is different for different types of data such as Social Security Numbers, financial account numbers, credit or debit card numbers, and the like.

8. The method of claim 1, wherein the first portion and second portion of the tokenized data string are stored in the secure database in an encrypted form.

9. The method of claim 1, further comprising the steps of storing a plurality of encryption keys in the secure database that are associated with a plurality of client processes, and utilizing a particular encryption key for the encrypting step that is identified with a particular client process.

10. The method of claim 1, further comprising the steps of storing information in the secure database that points to an entry in a separate storage device that stores the encryption key, and retrieving the encryption key from the separate storage device.

11. The method of claim 1, further comprising the step of retrieving the encryption key from the secure database.

12. The method of claim 1, wherein the method is carried out in a secure server operated in a secure environment to which personnel associated with the client process do not have access.

13. The method of claim 1, wherein the token generation algorithm generates a sequential index number for use as the token body portion.

14. The method of claim 1, wherein the token generation algorithm generates a random number for use as the token body portion.

15. The method of claim 1, wherein the token generation algorithm generates a token body portion for use as an index in the secure database.

16. The method of claim 1, wherein the token generation algorithm generates a token body portion that causes the tokenized data string to pass a Luhn test for a credit card number corresponding to the input data string.

17. The method of claim 1, wherein the token generation algorithm generates a token body portion that causes the tokenized data string to fail a Luhn test for a credit card number corresponding to the input data string.

18. The method of claim 1, wherein the token generation algorithm generates a token body portion that is independent of a Luhn test for a credit card number.

19. The method of claim 1, further comprising the steps of:
calculating a unique digest corresponding to the tokenized data string using a first hash function, and
storing the unique digest in the secure database in association with the tokenized data string for use in rapid lookup of entries in the secure database.

20. The method of claim 19, wherein the first hash function is a function selected from the group consisting of: SHA-1, SHA-2, and MD5.

21. The method of claim 19, further comprising the steps of:
in response to a predetermined condition, deleting the ciphertext representation of the input data string associated with a particular tokenized data string from the secure database, leaving the tokenized data string in the secure data base stored in association with the unique digest;
in response to a subsequent providing of a second input data string of sensitive data by a client process, calculating a second unique digest corresponding to the second input data string using the first hash function;
using the second unique digest, accessing the secure database to determine whether there is an entry corresponding to the second input data string that contains a tokenized data string; and
in response to a determination that the secure database contains such an entry, returning the tokenized data string associated with the second input data string to the client process.

22. The method of claim 1, further comprising the step of masking one or more characters of the tokenized data string before execution of the step of returning the tokenized data string to the client process.

23. The method of claim 1, wherein the step of receiving an input data string comprises receiving a Tokenize Function call.

24. The method of claim 1, further comprising the steps of:
receiving a Lookup With Token function call from the client process in association with a selected tokenized data string;
accessing the secure database to determine whether there is an entry in the secure database corresponding to the selected tokenized data string;
in response to a determination that the secure database contains such an entry, retrieving the tokenized data string associated with the entry; and
returning a masked version of the tokenized data string associated with the entry to the client process.

25. The method of claim 1, further comprising the steps of:
receiving a Reveal function call from the client process in association with a selected tokenized data string;
determining whether the client process has authorization to retrieve the sensitive data associated with the selected tokenized data string;
accessing the secure database to determine whether there is an entry in the secure database corresponding to the selected tokenized data string;
in response to a determination that the secure database contains such an entry, retrieving the sensitive data associated with the entry; and
returning the sensitive data associated with the entry to the client process.

* * * * *